US006982813B2

(12) United States Patent
Hirata et al.

(10) Patent No.: US 6,982,813 B2
(45) Date of Patent: Jan. 3, 2006

(54) LIGHT QUANTITY CORRECTION METHOD FOR EXPOSING DEVICE, AND IMAGE FORMING DEVICE

(75) Inventors: Katsuyuki Hirata, Aichi-Ken (JP); Kentaro Katori, Toyokawa (JP); Tetsuya Sakai, Aichi-Ken (JP); Tomoki Wada, Daito (JP)

(73) Assignee: Minolta Co., Ltd., Osaka (JP)

( * ) Notice: Subject to any disclaimer, the term of this patent is extended or adjusted under 35 U.S.C. 154(b) by 842 days.

(21) Appl. No.: 09/776,883

(22) Filed: Feb. 6, 2001

(65) Prior Publication Data

US 2001/0040676 A1    Nov. 15, 2001

(30) Foreign Application Priority Data

Feb. 16, 2000 (JP) ............................. 2000-037750
Aug. 23, 2000 (JP) ............................. 2000-251847

(51) Int. Cl.
*G03B 27/32* (2006.01)
*G06E 1/02* (2006.01)
*B41J 2/45* (2006.01)
*G06K 9/32* (2006.01)

(52) U.S. Cl. .................. 358/1.9; 355/77; 347/238; 382/294

(58) Field of Classification Search ............... 358/1.9, 358/509, 296, 486, 474, 302, 298, 475; 382/169, 382/216; 355/67, 40, 50; 347/130; 362/800
See application file for complete search history.

(56) References Cited

U.S. PATENT DOCUMENTS

| 5,481,337 | A | * | 1/1996 | Tsuchiya et al. ............. 399/46 |
| 5,694,223 | A | * | 12/1997 | Katori et al. ............... 358/300 |
| 5,887,223 | A | * | 3/1999 | Sakai et al. ............... 399/60 |
| 6,035,076 | A | * | 3/2000 | Nagase ..................... 382/294 |
| 6,104,509 | A | * | 8/2000 | Yoshida .................... 358/509 |
| 6,121,993 | A | * | 9/2000 | Maekawara et al. ......... 347/236 |
| 6,163,331 | A | * | 12/2000 | Fujita ..................... 347/236 |
| 6,172,701 | B1 | * | 1/2001 | Tokura et al. .............. 347/237 |
| 6,198,491 | B1 | * | 3/2001 | Honda ...................... 347/129 |
| 6,330,083 | B1 | * | 12/2001 | Nabeshima et al. .......... 358/474 |
| 6,344,661 | B1 | * | 2/2002 | Nagase et al. .............. 257/40 |
| 6,469,727 | B1 | * | 10/2002 | Wada et al. ................ 347/240 |
| 6,525,840 | B1 | * | 2/2003 | Haraguchi et al. .......... 358/296 |
| 6,614,945 | B1 | * | 9/2003 | Takaoka ................... 382/274 |
| 6,625,331 | B1 | * | 9/2003 | Imaizumi et al. ........... 382/294 |
| 6,665,502 | B2 | * | 12/2003 | Hirobe et al. ............... 399/49 |

FOREIGN PATENT DOCUMENTS

| JP | S63-014169 | 1/1988 |
| JP | H05-41758 | 2/1993 |
| JP | H07-319369 | 12/1995 |
| JP | 10-000811 | 1/1998 |
| JP | 10-297015 | 11/1998 |
| JP | 11-028836 | 2/1999 |
| JP | H11-275361 | 10/1999 |

OTHER PUBLICATIONS

US 6,424,432, 07/2002, Koide et al. (withdrawn)

* cited by examiner

Primary Examiner—Kimberly Williams
Assistant Examiner—Charlotte M. Baker
(74) Attorney, Agent, or Firm—Morrison & Foerster LLP

(57) ABSTRACT

An image forming device capable of providing an image of excellent quality without unevenness of density. According to the image forming device, a controller measures light quantity for each light emitting element of the exposing device as to the pattern where only one of the light emitting elements is turned on, and as to the pattern where all the light emitting elements are turned on. Based on the data about the measured light quantity, a change rate in the light quantity distribution of the exposing device is calculated. Based on the data about the measured light quantity and the change rate in the light quantity distribution calculated, correction value for each of the light emitting elements of the exposing device is determined.

30 Claims, 23 Drawing Sheets

LIGHT QUANTITY CORRECTION METHOD FOR EXPOSING DEVICE, AND IMAGE FORMING DEVICE

This application is based on application Nos. 2000-37750 and 2000-251847 filed in Japan, the contents of which are hereby incorporated by reference.

BACKGROUND OF THE INVENTION

1. Field of the Invention

The present invention relates to a method for correcting a quantity of light emitted from a solid state scanning-type exposing device which is mounted on a digital copying machine, a printer, and the like, and an image forming device provided with the solid state scanning-type exposing device. More specifically, the present invention relates to a method for correcting a quantity of light emitted from an exposing device with high accuracy, and an image forming device capable of providing an image of excellent quality without unevenness of density.

2. Description of the Related Art

As for an image forming device provided with a solid state scanning-type exposing device, it is necessary to prevent each of the light emitting elements of the exposing device from emitting different quantity of light (hereinafter, this state is referred to as unevenness of light quantity). That is, if each of the light emitting elements emits light with different quantity to each other, an output image has unevenness of density. In the image forming device of these kinds, the quantity of light is corrected for each of the light emitting elements so that all the light emitting elements of the exposing device should emit the same quantity of light. The reason why the unevenness of light quantity is generated in the exposing device is that each of the light emitting elements emits light with different quantity to each other, and that the light emitting elements have light emitting characteristics different from each other, and the like.

In a widely used technique for correcting the quantity of light emitted from an exposing device to prevent the unevenness of light quantity from occurring, the light emitting elements thereof are turned on one by one to measure the quantity of light emitted from each of the light emitting elements. From the measured values and the reference value, a value for correcting the light quantity for each light emitting element is calculated. A typical example of such a technique is, for example, disclosed in Japanese Unexamined Patent Publication No. 10-181081. In the method disclosed in this patent publication, a quantity of light emitted from each of the light emitting diodes (LEDs: light emitting elements) is measured. Then, a target value for light quantity correction is determined for each of specified LEDs, based on the quantity of light emitted from each of the LEDs, in such a manner that the specific LEDs have different target values from each other. From the difference between the quantity of light emitted from each LED and the target value for light quantity correction corresponding to the light quantity of the LED, the correction value is calculated. In this method, the target values for light quantity correction are calculated based on the quantity of light emitted from each LED. The target values vary between specified LEDs. Then, the correction value is calculated based on the difference between the quantity of light emitted from each LED, and the target value for light quantity correction corresponding to the light quantity of the LED. By use of the correction value thus calculated, the light quantity is corrected. In this manner, the change rate in quantity of light emitted from the exposing device can be reduced.

Japanese Unexamined Patent Publications Nos. 11-28836 and 10-297015 disclose a technique in which the unevenness of light quantities emitted from light emitting elements of an exposing device is detected by a sensor. Based on the detection result, correction data are produced. By use of the data, the quantity of light to form an image is controlled.

However, including that of Japanese Unexamined Patent Publication No. 10-181081 described above, there is the following disadvantage in the conventional techniques for correcting the quantity of light emitted from an exposing device. In the state where the exposing device is mounted to an image forming device, it is impossible to prevent the unevenness of light quantity from occurring. As a result, the output image includes unevenness of density due to the uneven light quantity of the exposing device. This problem arises because the correction of the quantity of light emitted from the exposing device is conducted based on the quantity of light emitted from each of the light emitting elements thereof when each of them is turned on one by one in an off-line. In other words, the light emission pattern obtained at the time when the light quantity is measured to calculate the correction value is completely different from a light emission pattern obtained at the time when the actual printing is conducted. Due to the difference between the two light emission patterns, the light quantity distribution in the exposing device varies along with the heat generating temperature of the driving IC in the exposing device.

In addition, there are some cases where the distribution of the light quantity in the exposing device varies because the focus position is slightly shifted from the desired position when the exposing device is mounted to the image forming device. Also in such a case, correction of light quantity cannot be conducted properly, and becomes uneven. As a result, the output image includes unevenness of density.

SUMMARY OF THE INVENTION

The present invention has been conducted to solve the problems of the prior arts described above. The objective thereof is to provide a method for correcting an quantity of light emitted from an exposing device with high accuracy without unevenness of light quantity, and an image forming device capable of providing an image of excellent quality without unevenness of density.

According to the present invention, a light quantity correction method includes: Step 1 where an exposing device is allowed to emit light in a plurality of light emission patterns, and an quantity of light emitted from each light emitting element is measured for each light emission pattern; Step 2 where a change rate of a light quantity distribution of the exposing device is calculated based on the light quantity measured for each light emission pattern; and Step 3 where a correction value of the light quantity emitted from each light emitting element is calculated based on the light quantity measured in Step 1 and the change rate of the light quantity distribution calculated in Step 2.

In this light quantity correction method, in Step 1, the exposing device including a plurality of light emitting elements are allowed to emit light in a plurality of light emission patterns. In this state, the quantity of light emitted from each light emitting element is measured for each light emission pattern. Therefore, the number of data used in the light quantity measurement is a product of the number of the light emitting elements and the number of the light emission patterns. After that, in Step 2, the change rate in the light quantity distribution of the exposing device is calculated based on the light quantity measured for each light emission pattern. Then, in Step 3, a correction value of the light quantity for each light emitting element is calculated based on the light quantity measured in Step 1 and the change rate of the light quantity distribution calculated in Step 2.

As described above, the light quantity correcting method of the present invention calculates the correction value of the light quantity for each light emitting element based on the change rate of the light quantity distribution calculated in Step 2, as well as the light quantity measured in Step 1. Therefore, the light quantity is corrected with high accuracy. As a result, unevenness of light quantity is prevented from occurring in the exposing device, and therefore, an image of excellent quality without unevenness of density can be formed. Instead of obtaining the light quantity measurement data, a correction data (i.e. a temporary correction value) is calculated from the light quantity measurement data and then, the correction value can be calculated by use of the correction data.

The term "the change rate in light quantity distribution" means the difference between light quantity of the target light emitting element with all the light emitting elements of the exposing device being turned on and that of the target light emitting element when only the target light emitting element being turned on. Alternatively, the term "the change rate in light quantity distribution" means that the ratio between the light quantity of the target light emitting element with all the light emitting elements of the exposing device being turned on and that of the target light emitting element with only the target light emitting element being turned on, or the like.

Here, the plurality of light emission patterns are desirable to include: a first pattern where only one of all the light emitting elements of the exposing device is turned on; and a second pattern where all the light emitting elements of the exposing device are turned on. The term "the pattern where all the light emitting elements are turned on" includes the case where all the light emitting elements are turned on, as well as the case where only the light emitting elements which are in the vicinity of the target light emitting element and have influence on the measurement of the light quantity of the target light emitting element are turned on, and the case where the light emitting elements are alternately turned on one by one, and the like.

As described above, in the light quantity correction method of the present invention, the light quantity can be corrected with high accuracy while preventing the unevenness of light quantity from occurring with the state where the exposing device is mounted on the image forming device.

When the correction value is calculated in the course of the light quantity correction method of the present invention, a plurality of correction values of the light quantity for each of the light emitting elements may be calculated in Step 3. Then, among the plurality of correction values thus calculated, a correction value to be used for correcting the light quantity of the exposing device may be selected. When the change rate of light quantity distribution is calculated, a plurality of change rates of light quantity distribution of the exposing device may be calculated in Step 2. Then, a plurality of correction values to be used in correcting the light quantity of the exposing device may be calculated in Step 3 based on the plurality of change rates calculated in Step 2. In this manner, the light quantity can be corrected with higher accuracy.

According to the present invention, an image forming device comprises an exposing device provided with a plurality of light emitting elements, and a controller for conducting process including the following steps: Step 1 where the exposing device is allowed to emit light in a plurality of light emission patterns, and quantity of light emitted from each light emitting element is measured for each light emission pattern; Step 2 where a change rate of a light quantity distribution of the exposing device is calculated based on the light quantity measured for each light emission pattern; and Step 3 where a correction value of the light quantity emitted from each light emitting element is calculated based on the light quantity measured in Step 1 and the change rate of the light quantity distribution calculated in Step 2.

The image forming device comprises the exposing device provided with a plurality of light emitting elements. Based on image data, on-off control is conducted for the exposing device to form an image on an image carrier. Here, in the image forming device, the controller corrects the light quantity of the exposing device so as to obtain an output image of excellent quality, as follows. First, the controller allows the exposing device having a plurality of light emitting elements to emit lights with a plurality of light emission patterns. Then, the controller measures quantity of light emitted from each light emitting element for each light emission pattern. That is, the controller measures light quantity data corresponding to a product of the number of the light emitting elements and the number of light emission patterns. Next, the controller calculates the change rate in the light quantity distribution of the exposing device based on the light quantity measured for each light emission pattern. Then, the controller calculates the correction value of the light quantity for each light emitting element based on the light quantity measured in Step 1 and the light quantity distribution calculated in Step 2.

In this manner, the controller calculates the correction value based on the change rate of light quantity distribution calculated in Step 2, as well as the light quantity measured in Step 1. Therefore, the light quantity can be corrected with higher accuracy. As a result, the unevenness of light quantity of the exposing device is prevented from occurring, and an image of excellent quality without unevenness of density can be formed.

According to another aspect of the present invention, a light quantity correction method comprises steps of: Step 1 where an exposing device is allowed to emit light to form an optical pattern; Step 2 where the optical pattern formed in Step 1 is read; and Step 3 where a correcting value of light quantity for each light emitting element is calculated based on the data read in Step 2, wherein the optical pattern is constituted by a plurality of patterns having gradations different from each other.

In the light quantity correction method, the exposing device provided with a plurality of light emitting elements is allowed to emit light to form an optical pattern in Step 1. The optical pattern thus formed includes a plurality of patterns having gradations different from each other. Then, the optical pattern formed in Step 1 is read in Step 2. That is, the light emitting level for each light emitting element is detected. After that, in Step 3, the value for correcting the light quantity for each light emitting element is calculated based on the data read in Step 2, and the correction value thus calculated is stored.

In this manner, the light quantity correction method of the present invention enables a copying machine actually used now to produce adequate light quantity correction data with high accuracy in a simple manner and also to correct the light quantity. In addition, the optical pattern formed in Step 1 is made to be substantially the same as the optical pattern at the time of actual printing. In this manner, unevenness of density can also be prevented from occurring at the time of actual printing.

Here, the optical pattern is preferably formed on a recording medium. It is also desirable to form a mark to indicate positional information on the optical pattern. Alternatively, it is possible to provide an additional step where data read in Step 2 is subjected to smoothing. By performing the procedures described above, the accuracy of the correction value can be further improved.

According to another aspect of the present invention, an image forming device comprises: an exposing device provided with a plurality of light emitting elements; an image forming station for allowing the exposing device to emit light to form an optical pattern; a reader for reading the optical pattern formed by the image forming station; and a controller for conducting the process of calculating a correction value of light quantity for each light emitting element based on the data read by the reader, wherein the optical pattern is constituted by a plurality of patterns having gradations different from each other.

In the image forming device, the image forming station forms a plurality of optical patterns each containing a pattern of an image to be actually formed and having gradations different from each other, by use of the correction value corresponding to each light emitting element of the exposing device. Then, the reader reads the optical pattern which has been formed by the image forming station. After that, the controller conducts the process of calculating the value for correcting the light quantity for each light emitting element based on the data read by the reader. The controller stores the correction value thus calculated.

In this manner, the image forming device of the present invention enables a copying machine actually used now to produce adequate light quantity correction data with high accuracy in a simple constitution and also to correct the light quantity. In addition, the optical pattern formed in the image forming station is made to be substantially the same as the optical pattern formed at the time of actual printing. In this manner, the unevenness of density can be prevented from occurring at the time of actual printing and an image of excellent quality can be outputted.

In the image forming device of the present invention, the image forming station forms a mark to indicate positional information on the optical pattern. It is desirable that the controller obtains the positional information based on the mark read by the reader and corrects readout scaling of the reader based on the positional information thus obtained. In this case, the controller may conduct process of eliminating moisture on the recording medium before forming the optical pattern. By eliminating the moisture on the recording medium, the reader can obtain image information with high accuracy, even if the position of the paper is shifted from its accurate position at the reader during the feeding of the paper. In addition, by eliminating the moisture on the recording medium, there arises no change in size of the recording medium by elongation or construction thereof. As a result, the accuracy of the reading ability of the reader is not impaired.

In the image forming device of the present invention, it is desirable that the controller conducts smoothing for the data read by the reader in a direction the same as an optical pattern forming direction of the image forming station. In addition, in the image forming device of the present invention, instead of calculating the correction value based on the data read by the reader, the controller may output the data read by the reader to the outside of the image forming device and obtain correction value of light quantity for each light emitting element from the outside of the image forming device. In the image forming device of the present invention, it is preferable that the reader reads the optical pattern in a direction perpendicular to the direction in which the image forming station forms the optical patterns.

DETAILED DESCRIPTION OF THE PREFERRED EMBODIMENT

Hereinafter, embodiments relating to method for correcting quantity of light emitted from the exposing device and image forming devices of the present invention will be described in detail with reference to drawings. In the following embodiments, the description will be made as to the case where the present invention is applied to a full-color copying machine.

(First Embodiment)

Figure 1:
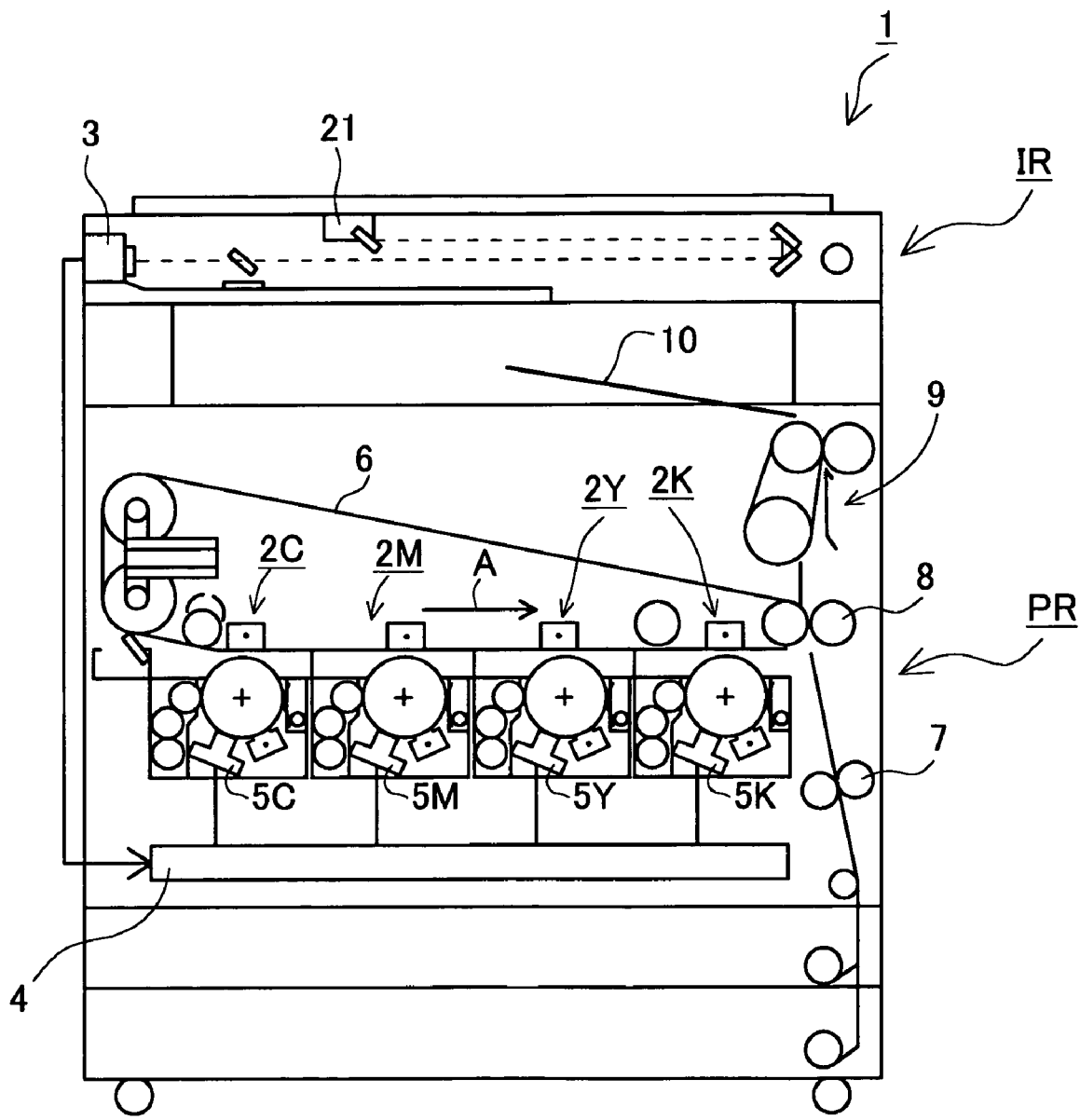
FIG. 1 is a diagram showing schematic structure of a copying machine.

First, a copying machine will be schematically described. As shown in FIG. 1, a copying machine 1 according to the first embodiment is a tandem type full color copying machine including image forming stations 2C, 2M, 2Y, and 2K which respectively correspond to each color of cyan (C), magenta (M), yellow (Y), and black (K). The copying machine 1 is constituted by an image reading section IR for reading an image data from a document, and a printer section PR for printing the image on printing paper. In the image reading section IR, a scanner 21 is moved to scan the entire surface of the document from which data is read. When scanned by the scanner 21, the surface of the document reflects light, and the reflected light focuses an image on a CCD sensor 3 via various mirrors. As a result, the CCD sensor 3 obtains information about the image.

On the other hand, in the printer section PR, the image forming stations 2C, 2M, 2Y, and 2K have LED heads 5C, 5M, 5Y, and 5K respectively, which are exposing devices. Into each of the image forming stations 2C, 2M, 2Y, and 2K, the image data output from CCD sensor 3 and other signals are inputted via an image signal processing section 4. Upon receiving the image data and the signals, the image forming stations 2C, 2M, 2Y, and 2K respectively produce toner images in the corresponding colors. The toner images in the colors corresponding to the image forming stations are sequentially transferred and superimposed on top of each other on a transfer belt 6 which rotates in a direction shown by an arrow A in FIG. 1.

In synchronization with the above processing, a piece of printing paper is supplied from a paper cassette. The printing paper is sent to a nip section between a transfer roller 8 and the transfer belt 6 via a carrier roller 7. At the nip section, a superimposed toner image is transferred onto the printing paper from the transfer belt 6. After the superimposed toner image is transferred onto the printing paper, the printing paper is discharged onto a paper discharge tray 10 via a fixing device 9 of a belt fixing type. In the fixing device 9, the superimposed toner image is heated and melted or is just heated and fixed as a full color image on the printing paper.

An image signal processing section 4 conducts processing for the image signal outputted from the CCD sensor 3. The LED heads 5C, 5M, 5Y, and 5K (hereinafter, the color codes C, M, Y, and K will be omitted) are used to write an electrostatic latent image on a photosensitive drum for each of the image forming stations. Hereinafter, schematic structures of the image signal processing section 4 and the LED heads 5 will be described with reference to FIGS. 2 and 3.

Figure 2:
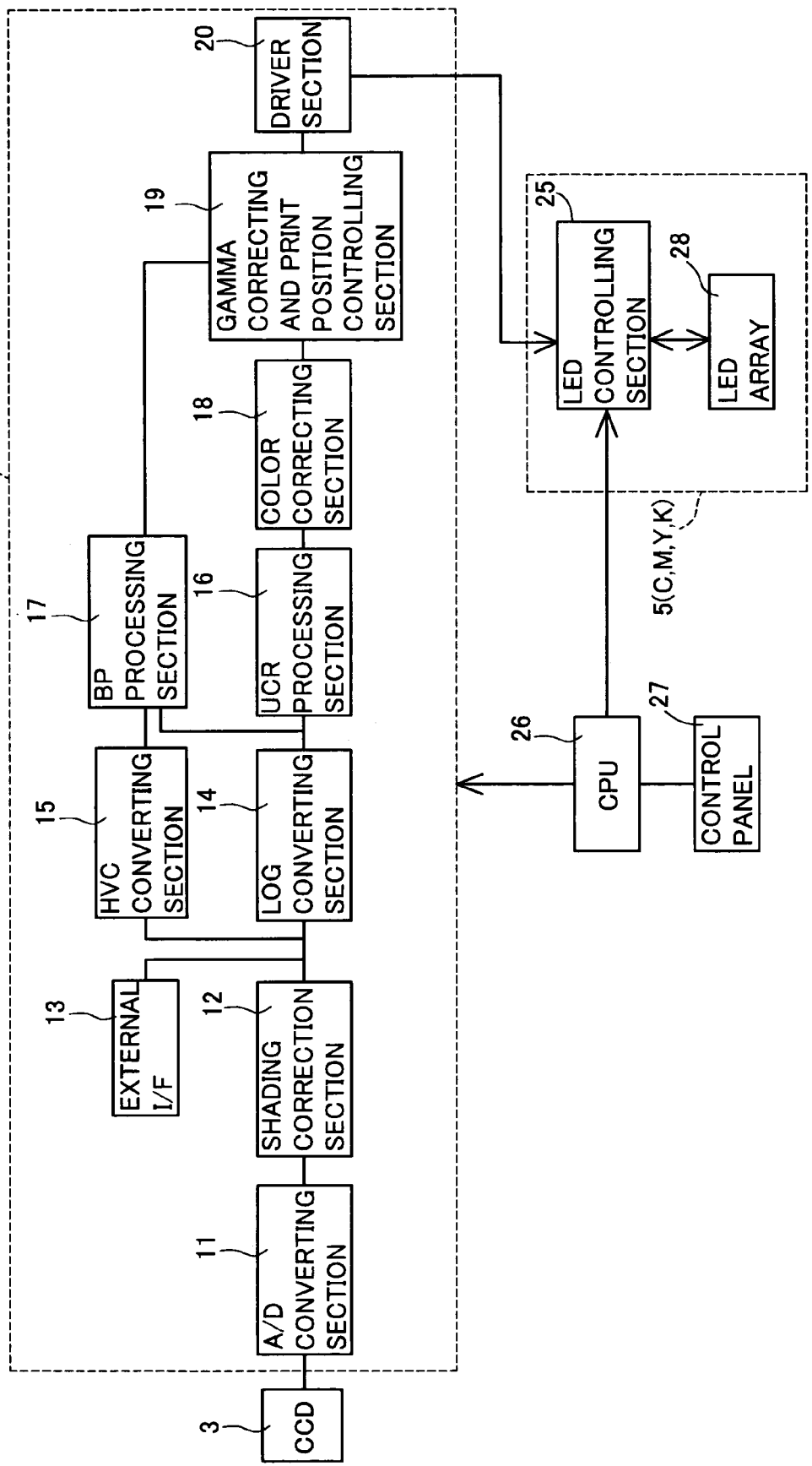
FIG. 2 is a block diagram showing a schematic structure of a controller and an LED head.

As shown in FIG. 2, the image signal processing section 4 includes an A/D converting section 11, a shading correcting section 12, an external interface (hereinafter, referred to as "an external I/F") 13, a LOG converting section 14, an HVC converting section 15, a UCR processing section 16, a BP processing section 17, a color correcting section 18, a gamma correcting and print position controlling section 19, and a driver section 20.

The A/D converting section 11 converts an analog signal outputted from the CCD sensor 3 into a digital signal. The shading correcting section 12 conducts a shading correction (i.e. a correction of variations in sensitivity and unevenness of illumination for each of pixels of the CCD sensor 3) for the signal outputted from the CCD sensor 3. The LOG converting section 14 converts an RGB signal proportional to the luminance obtained in the CCD sensor 3 into recording density signals C, M, and Y. The HVC converting section 15 converts the digital signal sent from the shading correcting section 12 into a brightness (V) and a color saturation (C). The UCR processing section 16 conducts under color removal for removing a gray color component from the C, M, and Y signals. The BP processing section 17 produces a black color recording signal K. The color correcting section 18 produces a recording signal which is capable of conducting a recording in a desired color, wherein the spectral characteristic of the toner actually used and the recording process are took into consideration. The gamma correcting and print position controlling section 19 conducts a signal conversion (i.e. a gamma correction) for the recording signal which has been subjected to color correction, in order that the recording density assumes a linear profile as close as possible, and controls the correction of the print position.

A CPU 26 for entirely controlling the copying machine 1 is connected to the image signal processing section 4. Therefore, the image signal processing section 4 is also controlled by the CPU 26. To the CPU 26, a control panel 27 for inputting a command for the copying machine 1 is connected. By operating the control panel 27, the operator can give various commands to the copying machine 1.

Figure 3:
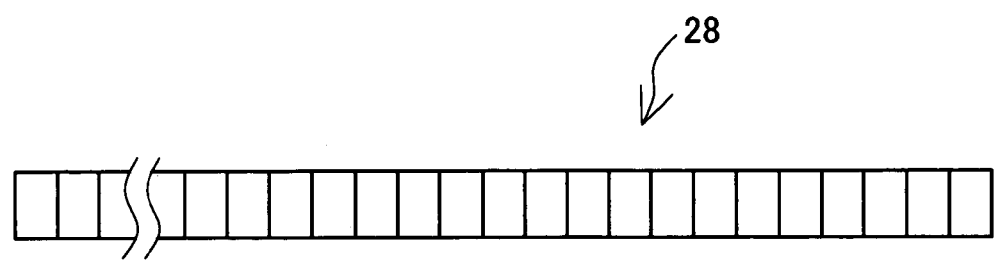
FIG. 3 is a diagram showing a schematic structure of an LED array.

On the other hand, the LED head 5 includes an LED controlling section 25, and an LED array 28. As shown in FIG. 3, the LED array 28 is constituted by a plurality of light emitting elements arranged in one line. Each of the light emitting elements corresponds to one pixel along their arranged direction, and an element address is allocated to each of the light emitting elements, as will be described later. The light emitting operation of the LED array 28 constituted by a plurality of the light emitting elements as described above is controlled by the LED controlling section 25. The LED controlling section 25 is, as shown in FIG. 2, connected to the CPU 26 and the driver section 20 of the image signal processing section 4. The CPU 26 controls the copying machine 1 entirely, and also stores various values for use in correcting light quantity of the LED array 28.

Figure 4:
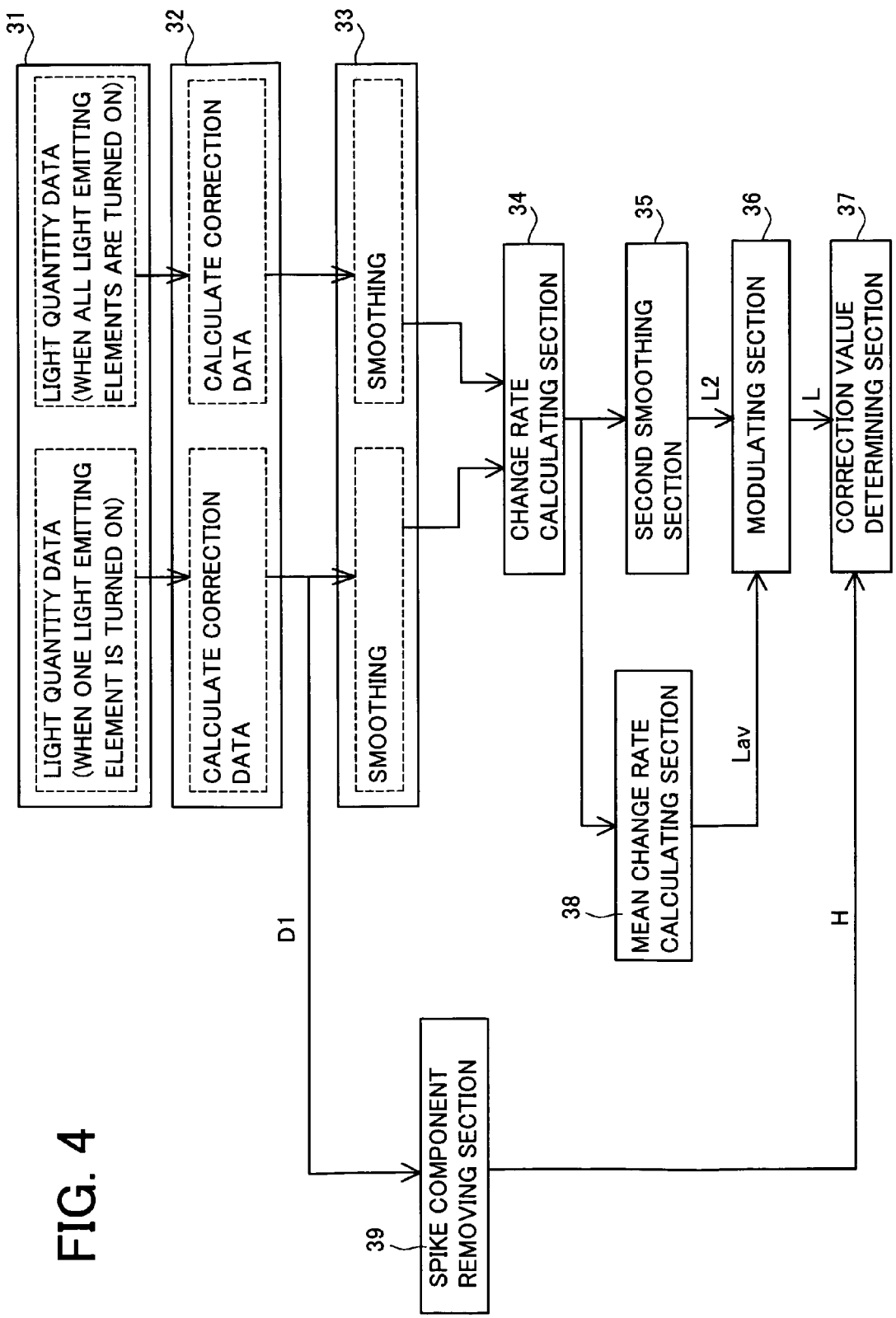
FIG. 4 is a block diagram showing a schematic structure of LED controlling section.

Hereinafter, the schematic structure of the LED controlling section 25 will be described with reference to FIG. 4. In order to correct the light quantity of the LED array 28, the LED controlling section 25 includes a light quantity measuring section 31, a correction data calculating section 32, a first smoothing section 33, a change rate calculation section 34, a second smoothing section 35, a modulating section 36, a correction value determining section 37, a mean change rate calculating section 38, and a spike component removing section 39.

The light quantity measuring section 31 allows the LED array 28 to emit light in a plurality of light emission patterns, and measures the quantity of light from each of the light emitting elements of the LED array 28 for each light emission pattern. In this embodiment, the light quantity measuring section 31 conducts measurement for a target light emitting element of the LED array 28 in two cases: only one target light emitting element is turned on and the light quantity emitted therefrom is measured; and all the light emitting elements are turned on, and in this state, the light quantity emitted from the target light emitting element is measured.

The correction data calculating section 32 calculates correction data (i.e. a temporary correction value). Specifically, the correction data is calculated from the following expression, based on the data about the light quantity measured by the light quantity measuring section 31 and the mean light quantity of the LED array 28:

(100×(mean light quantity/light quantity data)−100)/(tilt)

where the "tilt" is a tilt of a light quantity correction approximate expression calculated from light quantity data for each light emitting element and is an eigen value thereof.

The first smoothing section 33 and the second smoothing section 35 conduct smoothing (for the target light emitting element ±10 light emitting elements) for a signal which is input into each of them. The change rate calculating section 34 calculates a change rate in the light quantity distribution. Specifically, the change rate calculating section 34 calculates the difference between the light quantity of the target light emitting element in the case where only the target light emitting element is turned on, and the light quantity of the target light emitting element in the case where all the light emitting elements are turned on. Instead of this difference, it is also possible to obtain the ratio between the light quantity of the target light emitting element when only the target light emitting element is turned on, and the light quantity of the target light emitting element when all the light emitting elements are turned on.

The modulating section 36 conducts modulation for the change rate calculated in the change rate calculating section 34. Specifically, defining the output from the second smoothing section 35 as L2, and the output from the mean change rate calculating section 38 as Lav, the modulating section 36 conducts modulation expressed by the following:

(L2−Lav)×(rate of modulation)+Lav

The correction value determining section 37 calculates a new correction value for each light emitting element of the LED array 28. Specifically, the correction value determining section 37 adds the output (H) from the spike component removing section 39 and the output (L) from the modulating section 36 with each other to calculate a new correction value. The spike component removing section 39 conducts filtering for the correction data calculated from the light quantity data obtained in the case where only the target light emitting element is turned on. The filtering is conducted by use of the value obtained from differentiation of the target light emitting element ±6 light emitting elements.

Figure 5:
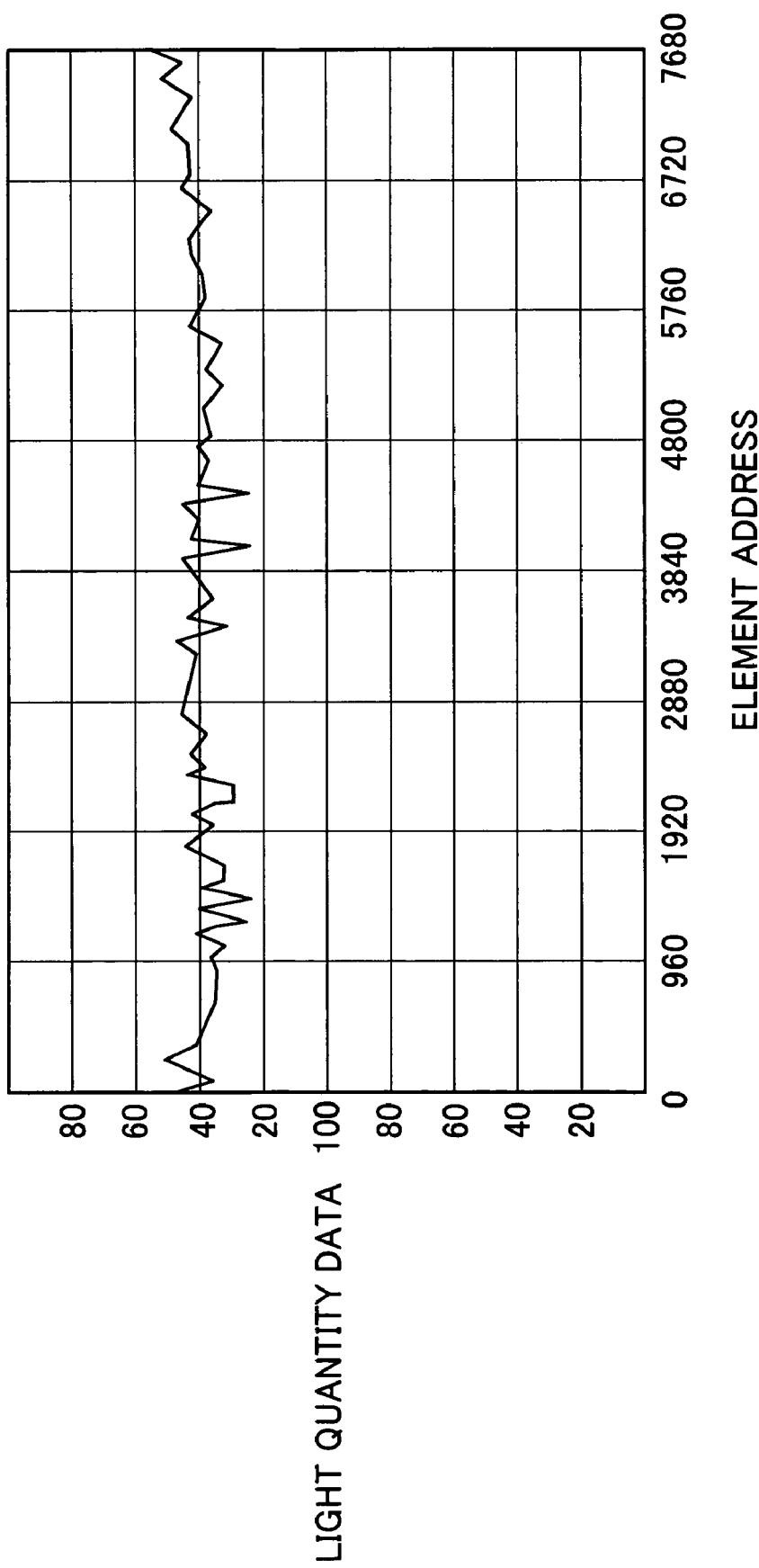
FIG. 5 shows an example of light quantity data measured by light quantity measuring section.

Next, the method for correcting quantity of light emitted from the LED array 28 in the copying machine 1 having the structure described above will be explained. When it becomes necessary to obtain a new correction value, the CPU 26 outputs a command for calculating a correction value to the LED controlling section 25. Then, the light quantity measuring section 31 measures the light quantity for each light emitting element of the LED array 28 in the case where only one of the light emitting elements thereof is turned on, and in the case where all the light emitting elements thereof are turned on. An example of the result of the light quantity measurement is shown in FIG. 5 (i.e. in the case where the correction data is "32").

Figure 6:
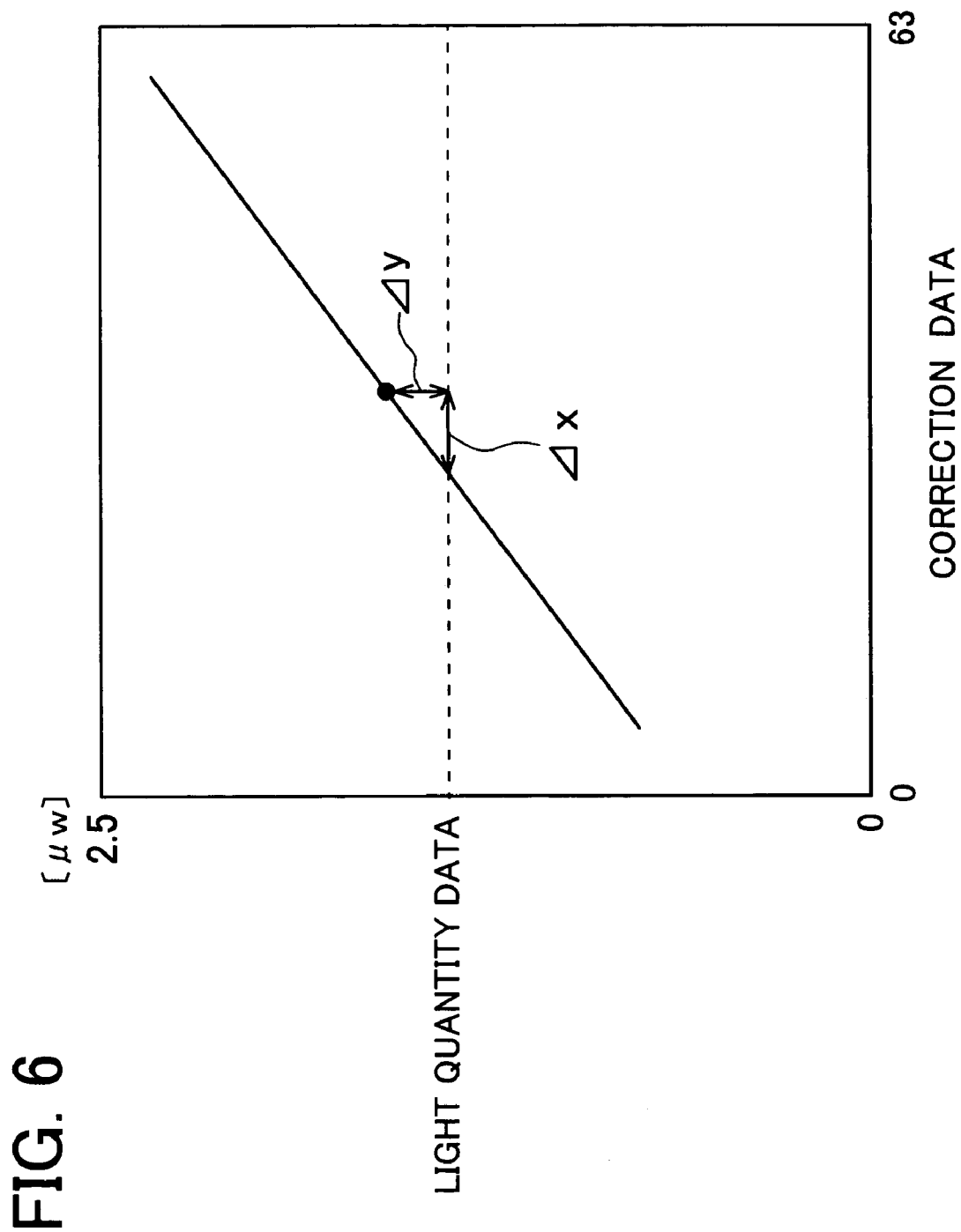
FIG. 6 is a diagram for illustrating method of calculating a correction data.

After that, the correction data calculating section 32 calculates correction data for each light emitting element of the LED array 28, based on the data about the light quantity measured by the light quantity measuring section 31. In other words, the correction data calculating section 32 calculates a light quantity correction approximate expression from light quantity data for each light emitting element of the LED array 28. Then, the correction data calculating section 32 calculates the correction data for each light emitting element to realize the mean light quantity of all the light emitting elements. Specifically, as shown in FIG. 6, the value Δx required for decreasing the light quantity by Δy is calculated for each light emitting element. That is, the value Δx obtained in the calculation is the correction data. The solid line in FIG. 6 shows a light quantity change approximate expression, and the broken line shows a mean light quantity of all the light emitting elements.

Thus-calculated correction data is input into the first smoothing section 33 where the smoothing of the correction data is conducted. Among the correction data calculated in the correction data calculating section 32, the correction data calculated from the light quantity data obtained in the case where only one light emitting element is turned on is input into the first smoothing section 33, and also input into the spike component removing section 39. In the spike component removing section 39, the input correction data is subjected to filtering so as to remove the spike component therefrom. After the spike component is removed, the correction data is input into the correction value determining section 37.

Figure 7:
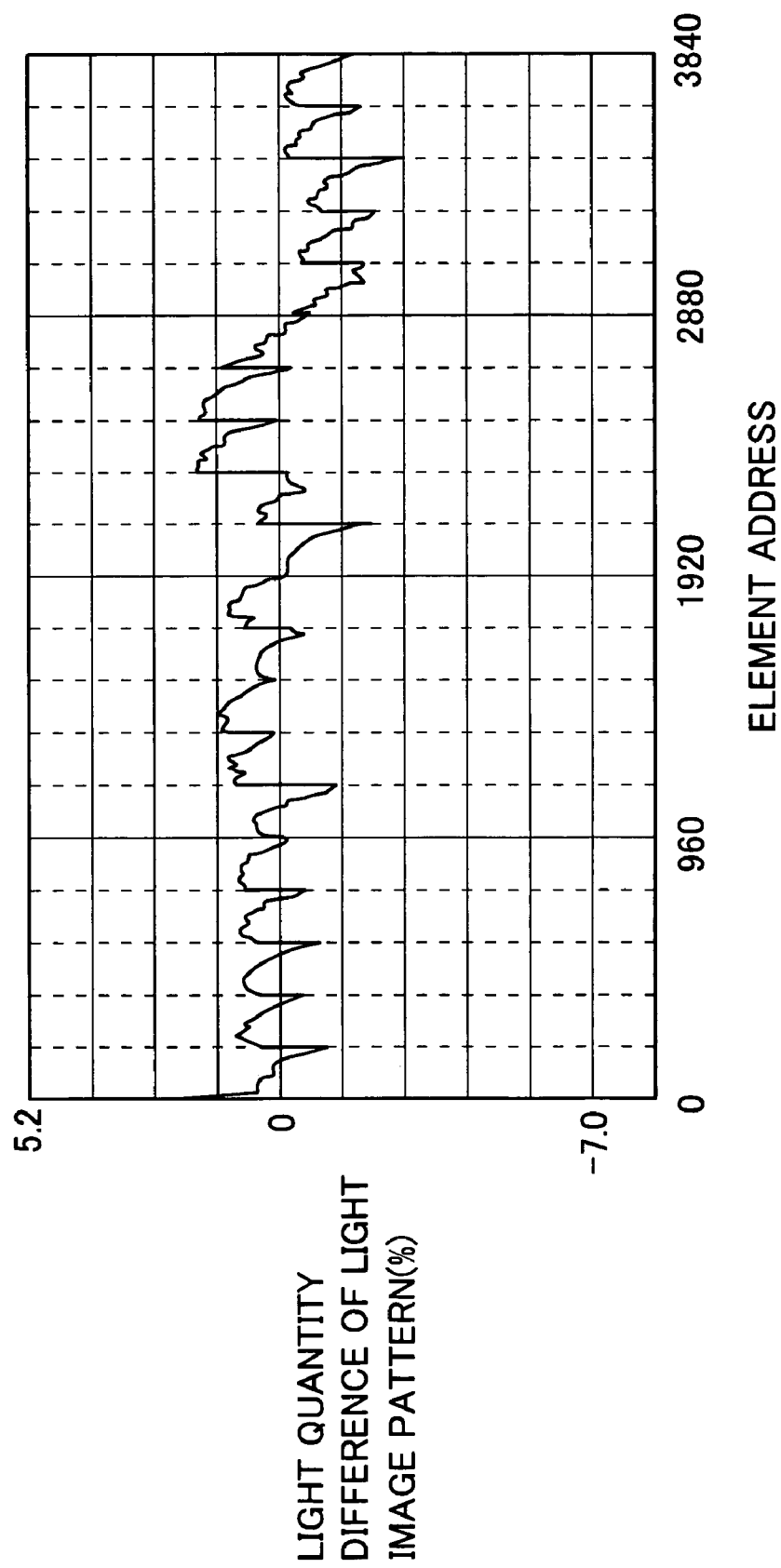
FIG. 7 shows an example of light-quantity-distribution change rate calculated by change rate calculating section.

On the other hand, the correction data after being subjected to the smoothing in the first smoothing section 33, is input into the change rate calculating section 34. The change rate calculating section 34 calculates the difference between the light quantity data in the case where only one light emitting element is turned on, and the light quantity data in the case where all the light emitting elements are turned on. The result of the calculation (i.e. the change rate data) is shown in FIG. 7. The change rate data is input into the second smoothing section 35 and the mean change rate calculating section 38, respectively. In the second smoothing section 35, the input change rate data is subjected to smoothing, and then, is input into the modulating section 36. On the other hand, in the mean change rate calculating section 38, a mean change rate is calculated from the input change rate data, and then is input into the modulating section 36. As a result, the change rate data (L2) subjected to smoothing and the mean change rate (Lav) are input into the modulating section 36.

Figure 8:
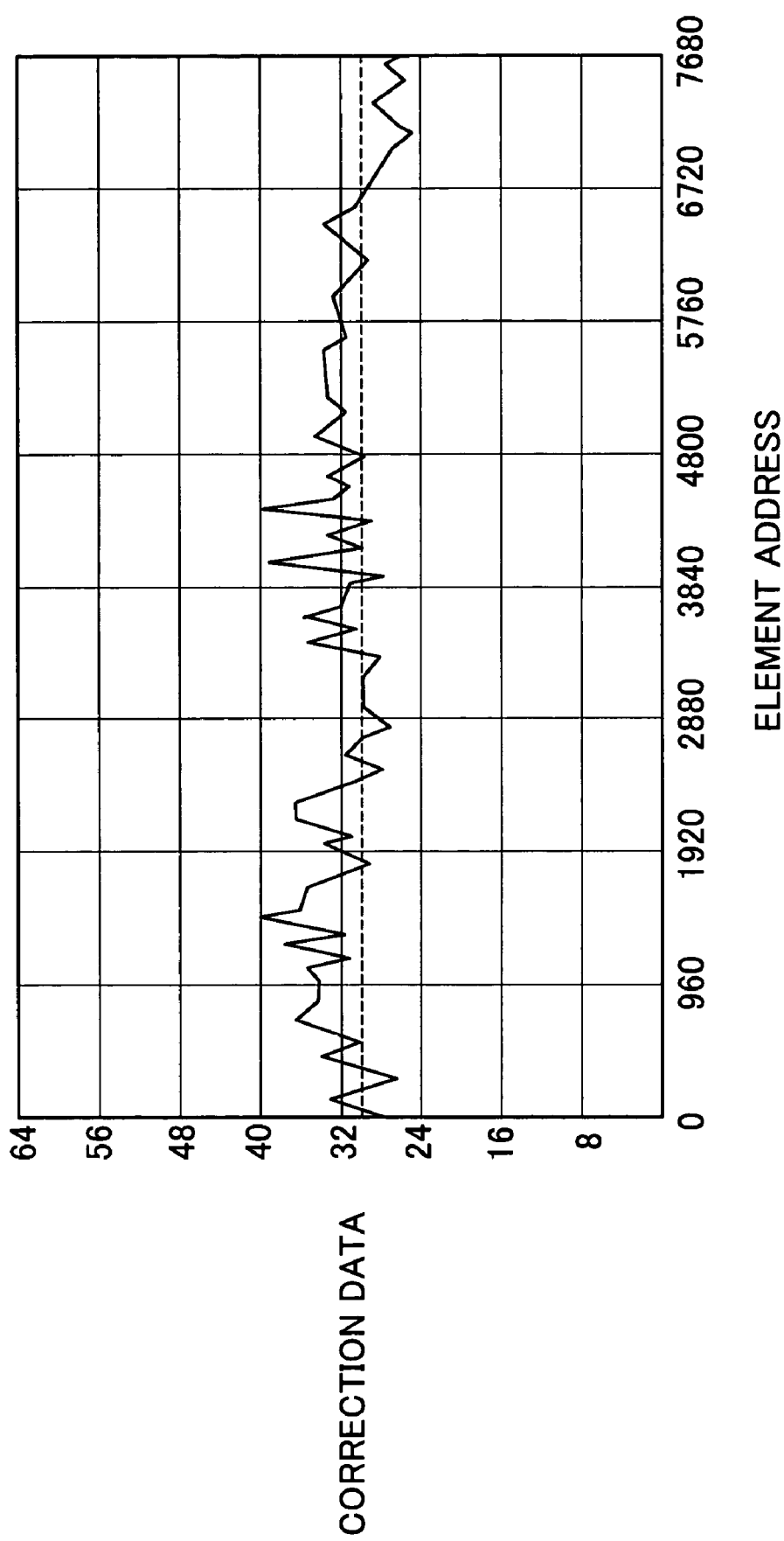
FIG. 8 shows an example of a correction value newly calculated.

After that, in the modulating section 36, the change rate data (L2) is subjected to modulation by use of the mean change rate (Lav). The result of the modulation is input into the correction value determining section 37. The correction value determining section 37 adds the output (L) from the modulating section 36 and the output (H) from the spike component removing section 39 with each other to calculate a new correction value. An example of the result of calculating a new correction value (in the case where the correction data is "32") is shown in FIG. 8. The solid line in FIG. 8 shows a new correction value, and the broken line shows a correction value before correction (i.e. a conventional correction value).

In comparison between FIG. 8 and FIG. 5, it is found that the shape of data is substantially symmetric with respect to a line (i.e. with respect to a horizontal line in FIGS. 8 and 5 as a center line). Therefore, when the light quantity of the LED array 28 is corrected by use of the new correction value shown by the solid line in FIG. 8, the light quantities of all the light emitting elements of the LED array 28 become substantially equal to each other. That is, the light quantity distribution becomes substantially even in the LED array 28, thereby preventing the unevenness of light quantity from occurring. Contrary to this, if the light quantity of the LED array 28 is corrected by use of the conventional correction value shown by the broken line in FIG. 8, the light quantities of the light emitting elements of the LED array 28 never become substantially equal to each other. As a result, it is realized that the light quantity of the LED array 28 is corrected with high accuracy in the copying machine 1 according to the present embodiment. Since the light quantity of the LED array 28 is corrected with high accuracy, the light quantity of the LED array 28 never becomes uneven. In this manner, an image of high quality without unevenness of density can be obtained from the copying machine 1.

As described above in detail, according to the first embodiment, in order to correct the light quantity of the LED array 28, the copying machine 1 includes the LED controlling section 25 having: the light quantity measuring section 31 for measuring the light quantity for each light emitting element as to the pattern where only one of the light emitting elements of the LED array 28 is turned on, and as to the pattern where all the light emitting elements of the LED array 28 are turned on; the change rate calculating section 34 for calculating the change rate in the light quantity distribution of the LED array 28, based on the data about the light quantity measured in the light quantity measuring section 31; and the correction value determining section 37 for determining a correction value for each light emitting element of the LED array 28, based on the data about the light quantity measured by the light quantity measuring section 31, and the change rate in the light quantity distribution calculated by the change rate calculating section 34. The LED controlling section 25 calculates the correction value taking into consideration the data about the light quantity measured by the light quantity measuring section 31 as well as the change rate in the light quantity distribution calculated in the change rate calculating section 34. As a result, the light quantity of the LED arrays 28 is corrected with improved accuracy. In this manner, unevenness of light quantity is prevented from occurring in the LED array 28, and an image of high quality without unevenness of density can be obtained from the copying machine 1.

(Second Embodiment)

Next, a second embodiment of the present invention will be described. A copying machine according to the second embodiment basically has the same structure as of the copying machine 1 of the first embodiment, except that a different method is employed for calculating the correction value for correcting the light quantity of the LED array. Therefore, the differences from the first embodiment will be mainly described in the second embodiment. The structures and operations same as those of the first embodiment will be properly omitted, and the constituent elements same as those of the first embodiment will be denoted by the same reference numerals.

Figure 9:
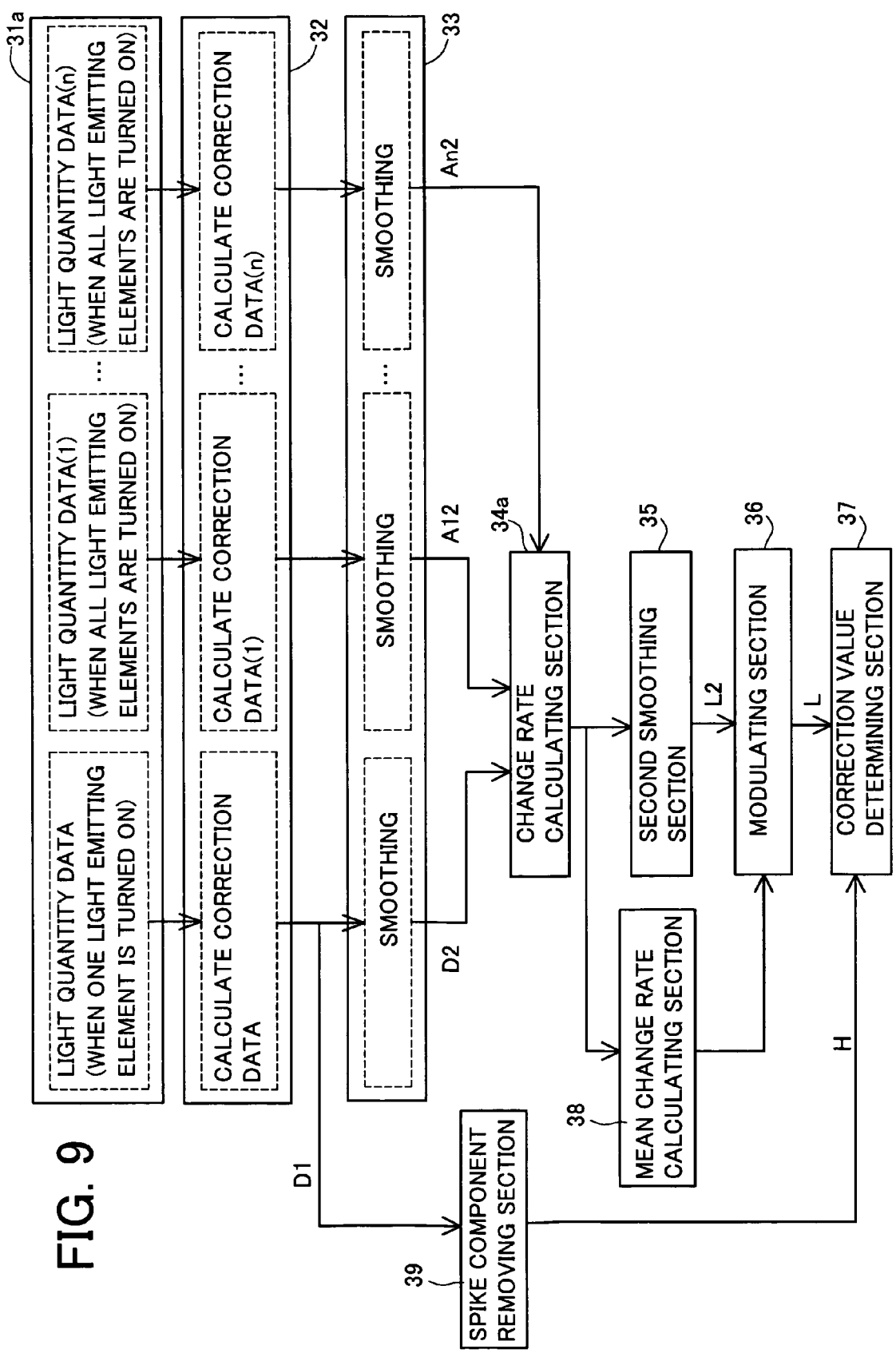
FIG. 9 is a block diagram showing a schematic structure of LED controlling section of the second embodiment.

A method for calculating the correction value, which is the different point from the first embodiment, will be described with reference to FIG. 9. As is the case of the first embodiment, the copying machine of the second embodiment includes an LED controlling section 25 for correcting the light quantity of the LED array 28. The LED controlling section 25 includes a light quantity measuring section 31a, a correction data calculating section 32, a first smoothing section 33, a change rate calculating section 34a, a second smoothing section 35, a modulating section 36, a correction value determining section 37, a mean change rate calculating section 38, and a spike component removing section 39.

If it becomes necessary to obtain a new correction value, a CPU 26 outputs a command for calculating a correction value to the LED controlling section 25. Upon receiving the command, the light quantity measuring section 31a in the LED controlling section 25 measures the light quantity for each light emitting element of the LED array 28 in the case where only one of the light emitting elements thereof is turned on, and in the case where all the light emitting elements thereof are turned on. As distinct from the first embodiment, the light quantity measuring section 31a conducts measurements in plural times (n-times) of the light quantity for each light emitting element of the LED array 28 in the case where all the light emitting elements thereof are turned on. The light quantity measurements in plural times in the case where the all the light emitting elements of the LED array 28 are turned on may be conducted by employing different light emission patterns for each time of measuring the light quantity, or alternatively, by employing the same light emission pattern but intentionally shifting the focus position or by employing the same light emission pattern. As is the latter case, if the measurement is conducted in increased number of times by employing the same light emission pattern, the measurement can be conducted with less errors. The focus position is shifted in a direction perpendicular to the longitudinal direction of the LED array 28 (i.e. a sub-scanning direction).

Next, the correction data calculating section 32 calculates the correction data for each light emitting element of the LED array 28, based on the data about the light quantity measured by the light quantity measuring section 31a. The calculated correction data is input into the first smoothing section 33 where the smoothing is conducted for the correction data. Among the correction data calculated in the correction data calculating section 32, the correction data calculated from the light quantity data obtained in the case where only one of the light emitting elements is turned on is input into the first smoothing section 33, as well as the spike component removing section 39. In the spike component removing section 39, the input correction data is subjected to filtering so as to remove the spike component therefrom. After the spike component is removed, the correction data is input into the correction value determining section 37.

On the other hand, the correction data after being subjected to smoothing in the first smoothing section 33 is input into the change rate calculating section 34a, where the change rate in the light quantity distribution is calculated. The method for calculating the change rate in the light quantity distribution is different from that of the first embodiment. That is, defining each of the outputs from the first smoothing section 33 into the change rate calculating section 34a, as D2, A12, and An2, the change rate is calculated from the following:

$$(\alpha \times A12 + \ldots + \epsilon \times An2)/D2$$

where $\alpha$ and $\epsilon$ are mixed rates, and are constant values in this embodiment.

The data about the change rate calculated in the change rate calculating section 34a is input into the second smoothing section 35 and the mean change rate calculating section 38, respectively. In the second smoothing section 35, the input change rate data is subjected to smoothing, and is input into the modulating section 36. On the other hand, in the mean change rate calculating section 38, a mean change rate is calculated from the input change rate data, and is input into the modulating section 36. As a result, the change rate data (L2) after being subjected to smoothing, and the mean change rate (Lav) are input into the modulating section 36.

After that, the modulating section 36 conducts modulation for the change rate data (L2) by use of the mean change rate (Lav). The result of the modulation is input into the correction value determining section 37. The correction value determining section 37 adds the output (L) from the modulating section 36 and the output (H) from the spike component removing section 39 with each other, and the sum of the addition is calculated as a new correction value.

As described above, in the copying machine according to this embodiment, the correction value for correcting the light quantity of the LED array 28 is calculated based on the light quantity of the target light emitting element as to the pattern where only the target light emitting element is turned on, and as to a plurality of patterns where all the light emitting elements are turned on. As a result, the light quantity of the LED array 28 can be corrected with higher accuracy. In this manner, unevenness of light quantity is prevented from occurring in the LED array 28, and therefore, an image of excellent quality without unevenness of density can be obtained from the copying machine.

As described above in detail, according to the second embodiment, in order to correct the light quantity of the LED array 28, the copying machine includes: the light quantity measuring section 31a for measuring the light quantity for each light emitting element as to the pattern where only one of the light emitting elements of the LED array 28 is turned on, and as to a plurality of patterns where all the light emitting elements thereof are turned on; the change rate calculating section 34a for calculating the change rate in the light quantity distribution of the LED array 28, based on the data about the light quantity measured in the light quantity measuring section 31a; and the correction value determining section 37 for determining the correction value for each light emitting element of the LED array 28, based on the data about the light quantity measured in the light quantity measuring section 31a and the change rate in the light quantity distribution calculated in the change rate calculating section 34a.

Therefore, the correction value determining section 37 calculates the correction value, taking into consideration the change rate in the light quantity distribution calculated in the change rate calculating section 34a, as well as the data about the light quantity measured in the light quantity measuring section 31a. When the change rate is calculated in the change rate calculating section 34a, a plurality of the data about the light quantity obtained in the case where all the light emitting elements of the LED array 28 are turned on are referred, instead of only one piece of data. In this manner, the correction value determining section 37 can calculate the correction value for correcting the light quantity of the LED array 28 more accurately. That is, the light quantity of the LED array 28 can be corrected with higher accuracy. Unevenness of light quantity is prevented from occurring in the LED array 28, and as a result, an image of excellent quality without unevenness of density can be obtained from the copying machine.

(Third Embodiment)

Next, a third embodiment of the present invention will be described. A copying machine according to the third embodiment basically has the same structure as of the copying machine 1 of the first embodiment, except that a different method is employed for calculating the correction value for correcting the light quantity. In the method of the third embodiment, as distinct from the first embodiment where only one new correction value is calculated, a plurality of new correction values are calculated, and the most adequate value is selected from them. In accordance with the difference in the correction value calculating method, the LED controlling section has a structure somewhat different from that of the first embodiment. Therefore, the differences from the first embodiment will be mainly described in the third embodiment. The structures and operations same as those of the first embodiment will be properly omitted, and the constituent elements same as those of the first embodiment will be denoted by the same reference numerals.

Figure 10:
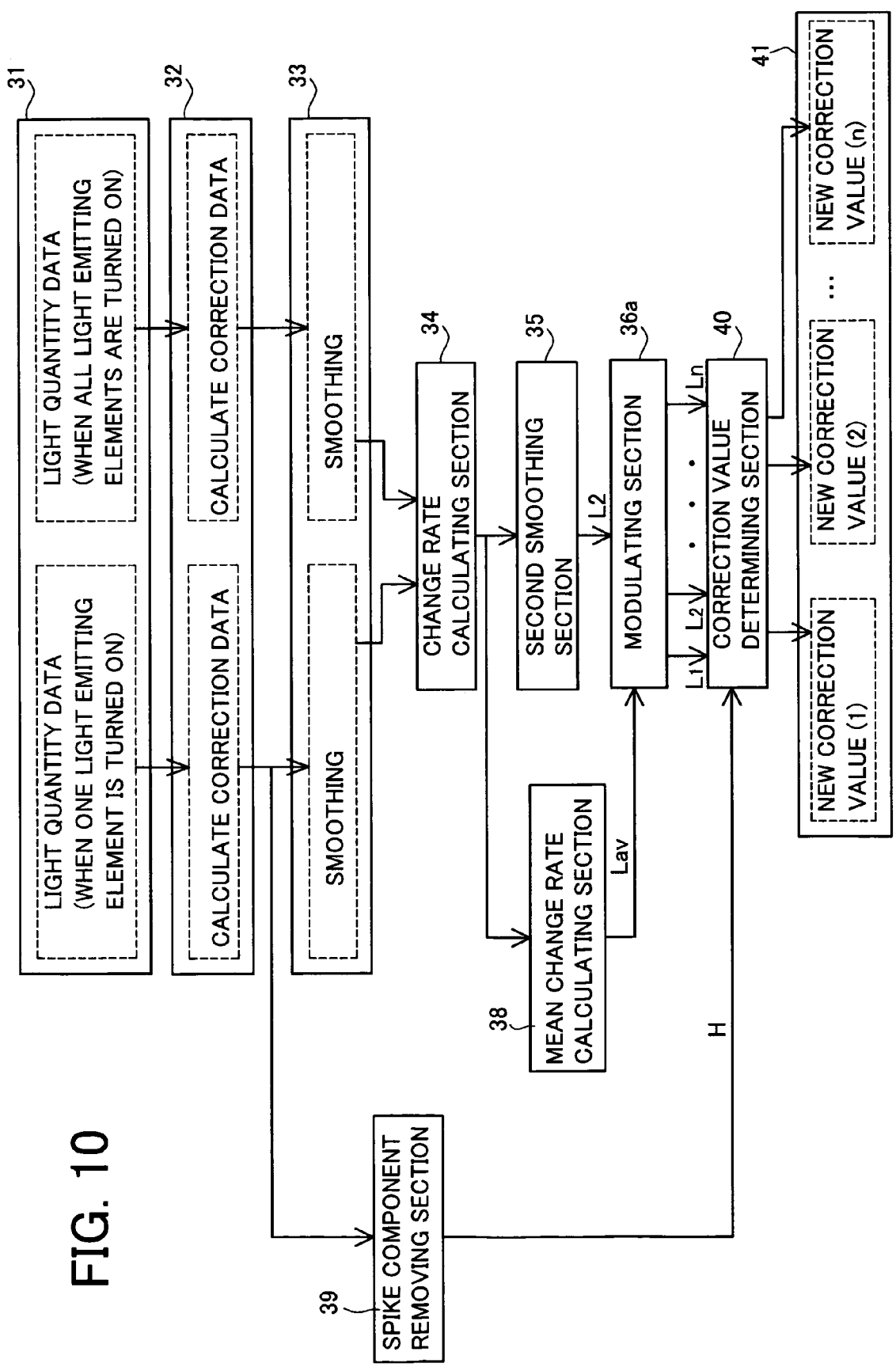
FIG. 10 is a block diagram showing a schematic structure of LED controlling section of the third embodiment.

A method for calculating the correction value, which is the different point from the first embodiment, will be described with reference to FIG. 10. As is the case of the first embodiment, the copying machine of the third embodiment includes an LED controlling section for correcting the light quantity of the LED array 28. The LED controlling section includes, as shown in FIG. 10, a light quantity measuring section 31, a correction data calculating section 32, a first smoothing section 33, a change rate calculating section 34, a second smoothing section 35, a modulating section 36a, a mean change rate calculating section 38, a spike component removing section 39, a correction value calculating section 40, and a correction value selecting section 41. That is, instead of the correction value determining section 37 in the first embodiment, the correction value calculating section 40 and the correction value selecting section 41 are provided.

The correction value calculating section 40 calculates a plurality of new correction values. The correction value selecting section 41 selects a correction value for correcting the light quantity of the LED array 28 from the plurality of correction values calculated by the correction value calculating section 40.

When it becomes necessary to obtain a new correction value, a CPU 26 outputs a command for calculating a correction value to the LED controlling section. Then, the light quantity measuring section 31 measures the light quantity for each of the light emitting element of the LED array 28 in the case where only one of the light emitting elements thereof is turned on, and in the case where all the light emitting elements thereof are turned on.

Next, the correction data calculation section 32 calculates correction data for each light emitting element of the LED array 28, based on the data about the light quantity measured by the light quantity measuring section 31. The correction data thus calculated is input into the first smoothing section 33 where the smoothing of the correction data is conducted. Among the correction data calculated in the correction data calculating section 32, the correction data calculated from the light quantity data obtained in the case where only one light emitting element is turned on is input into the first smoothing section 33, and also input into the spike component removing section 39. In the spike component removing section 39, the input correction data is subjected to filtering so as to remove the spike component therefrom. After the spike component is removed, the correction data is input into the correction value calculating section 40.

On the other hand, the correction data after being subjected to the smoothing in the first smoothing section 33, is input into the change rate calculating section 34 where the change rate in the light quantity distribution is calculated. The data about the change rate calculated in the change rate calculating section 34 is input into the second smoothing section 35 and the mean change rate calculating section 38, respectively. In the second smoothing section 35, the input change rate data is subjected to smoothing, and after that, is input into the modulating section 36a. On the other hand, in the mean change rate calculating section 38, the mean change rate is calculated from the data about the change rate which has been input from the change rate calculation section 34. The resultant mean change rate is input into the modulating section 36*a*. As a result, the change rate data (L2) after being subjected to smoothing and the mean change rate (Lav) are input into the modulating section 36*a*.

After that, in the modulating section 36*a*, the change rate data (L2) is subjected to modulation by use of the mean change rate (Lav). In this embodiment, plural data ($L_1$, $L_2$, ..., $L_n$) are obtained by changing the rate of modulation in the modulating section 36*a*. The results of the modulation are input into the correction value calculating section 40. The correction value calculating section 40 adds the outputs ($L_1$, $L_2$, ..., $L_n$) from the modulating section 36*a* and the output (H) from the spike component removing section 39 with each other, so as to calculate new correction values (1) to (n). All the correction values calculated in the correction value calculating section 40 are input into the correction value selecting section 41. The correction value selecting section 41 selects the correction value to be used for correcting the light quantity of the LED array 28.

As described above, in the copying machine according to this embodiment, the correction value selecting section 41 selects the correction value adequate for the state of the copying machine from the plurality of correction values calculated by the correction value calculating section 40. The light quantity of the LED array 28 is corrected by use of the correction value selected by the correction value selecting section 41. As a result, the light quantity of the LED array 28 can be corrected accurately in response to the change in the state of the copying machine. In this manner, unevenness of light quantity is prevented from occurring in the LED array 28, and an image of excellent quality without unevenness of density can be obtained from the copying machine.

As described above in detail, according to the third embodiment, in order to correct the light quantity of the LED array 28, the copying machine includes: the light quantity measuring section 31 for measuring the light quantity for each light emitting element as to the pattern where only one of the light emitting elements of the LED array 28 is turned on, and as to the pattern where all the light emitting elements thereof are turned on; the change rate calculating section 34 for calculating the change rate in the light quantity distribution of the LED array 28, based on the data about the light quantity measured in the light quantity measuring section 31; the modulating section 36*a* for modulating the change rate calculated in the change rate calculating section 34 at a plurality of rates of modulation to output a plurality of modulated data; the correction value calculating section 40 for calculating a plurality of correction values for each of the light emitting elements of the LED array 28, based on the data about the light quantity measured in the light quantity measuring section 31, and the plurality of rates of change in the light quantity distribution calculated in the change rate calculating section 34; and the correction value selecting section 41 for selecting the correction value to be used for correcting the light quantity from the plurality of correction values calculated in the correction value calculating section 40, and the like.

Therefore, the correction value calculating section 40 calculates a plurality of the correction values, taking into consideration the change rate in the light quantity distribution calculated in the change rate calculating section 34, as well as the data about the light quantity measured in the light quantity measuring section 31. The correction value selecting section 41 selects the correction value from the plurality of correction values calculated in the correction value calculating section 40, in response to the change in the state of the copying machine. In this manner, the LED controlling section can correct the light quantity of the LED array 28 in response to the change in the state of the copying machine. Therefore, even if there is a change in the operation state of the copying machine, unevenness of light quantity is prevented from occurring in the LED array 28, and as a result, an image of excellent quality without unevenness of density can be obtained from the copying machine.

(Fourth Embodiment)

Next, a fourth embodiment of the present invention will be described. A copying machine according to the fourth embodiment basically has the same structure as the copying machine of the third embodiment, except that a slightly different method is employed for calculating the correction value for correcting the light quantity of the LED array 28. Therefore, the differences from the third embodiment will be mainly described in the fourth embodiment. The structures and operations same as those of the third embodiment will be properly omitted, and the constituent elements same as those of the third embodiment will be denoted by the same reference numerals.

Figure 11:
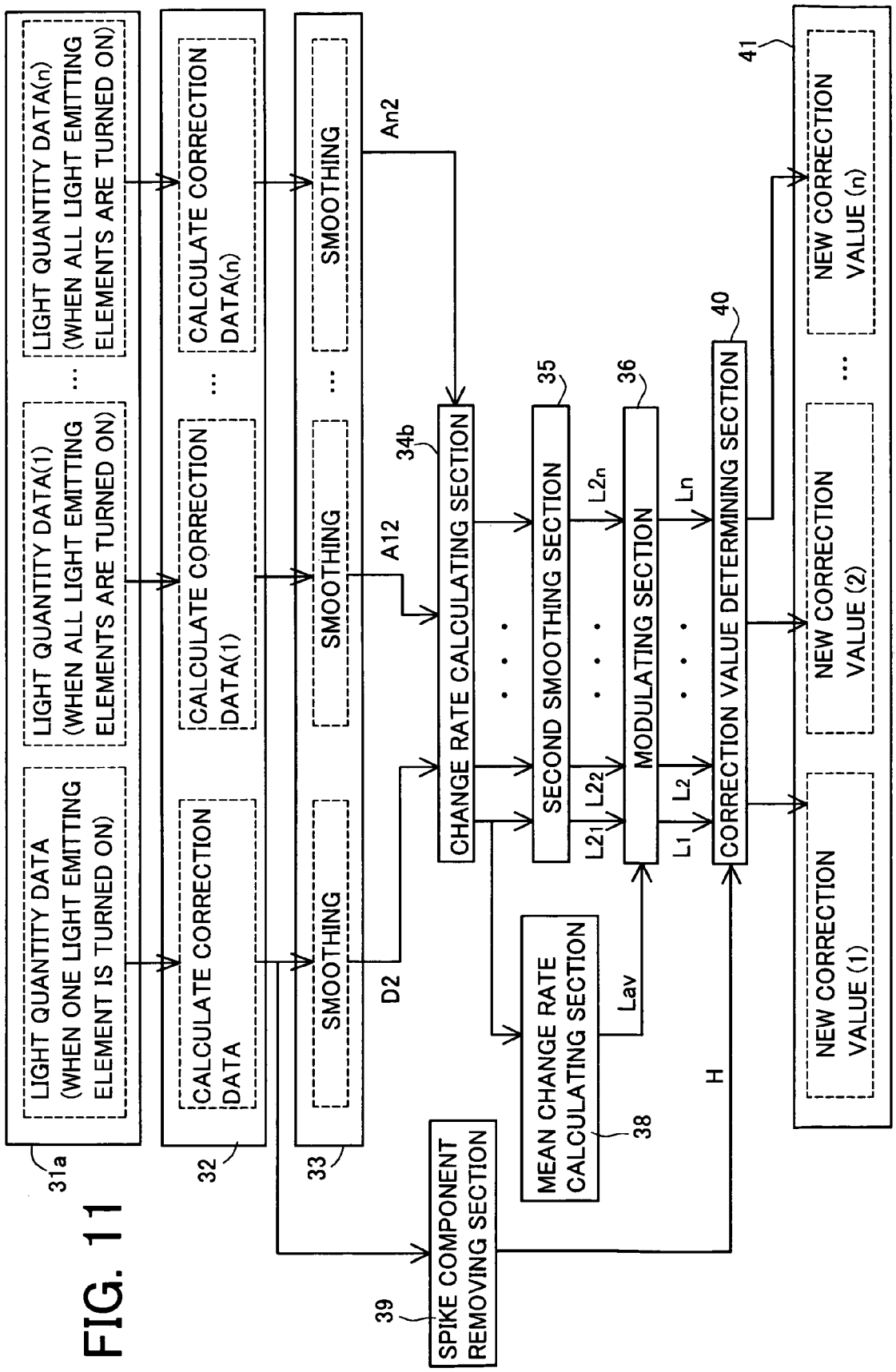
FIG. 11 is a block diagram showing a schematic structure of LED controlling section of the fourth embodiment.

A method for calculating the correction value, which is the different point from the third embodiment, will be described with reference to FIG. 11. As is the case of the third embodiment, the copying machine of the fourth embodiment includes an LED controlling section for correcting the light quantity of the LED array 28. The LED controlling section, as is shown in FIG. 11, includes a light quantity measuring section 31*a*, a correction data calculating section 32, a first smoothing section 33, a change rate calculating section 34*b*, a second smoothing section 35, a modulating section 36, a mean change rate calculating section 38, a spike component removing section 39, a correction value calculating section 40, and a correction value selecting section 41.

When it becomes necessary to obtain a new correction value, a CPU 26 outputs a command for calculating a correction value to the LED controlling section. Then, the light quantity measuring section 31*a* measures the light quantity for each light emitting element of the LED array 28 in the case where only one of the light emitting elements thereof is turned on, and in the case where all the light emitting elements thereof are turned on. As distinct from the third embodiment, the light quantity measuring section 31*a* conducts measurements in plural times (n-times) of the light quantity for each light emitting element of the LED array 28 in the case where all the light emitting elements thereof are turned on. The light quantity measurements in plural times in the case where the all the light emitting elements of the LED array 28 are turned on may be conducted by employing different light emission patterns for each time of measuring the light quantity, or alternatively, by employing the same light emission pattern but intentionally shifting the focus position. As is the latter case, the focus position is shifted in a direction perpendicular to the longitudinal direction of the LED array 28 (i.e. a sub-scanning direction).

Next, the correction data calculating section 32 calculates the correction data for each light emitting element of the LED array 28, based on the data about the light quantity measured by the light quantity measuring section 31*a*. The correction data thus calculated is input into the first smoothing section 33 where the smoothing is conducted for the correction data. Among the correction data calculated in the correction data calculating section 32, the correction data calculated from the light quantity data obtained in the case where only one of the light emitting elements is turned on is input into the first smoothing section 33, as well as the spike component removing section 39. In the spike component removing section 39, the input correction data is subjected to filtering so as to remove the spike component therefrom. After the spike component is removed, the correction data is input into the correction value calculating section 40.

On the other hand, the correction data after being subjected to smoothing in the first smoothing section 33 is input into the change rate calculating section 34b, where the change rate in the light quantity distribution is calculated. The method for calculating the change rate in the light quantity distribution is different from that of the third embodiment. That is, defining each of the outputs from the first smoothing section 33 into the change rate calculating section 34b, as D2, A12, and An2, the change rate is calculated from the following:

$$(\alpha \times A12 + \ldots + \epsilon \times An2)/D2$$

where $\alpha$ and $\epsilon$ are mixed rates, and in this embodiment the values of $\alpha$ and $\epsilon$ are varied to calculate plural data about the change rate.

The plural data about the change rate calculated in the change rate calculating section 34b is input into the second smoothing section 35 and the mean change rate calculating section 38, respectively. In the second smoothing section 35, the input change rate data is subjected to smoothing, and is input into the modulating section 36. On the other hand, in the mean change rate calculating section 38, a mean change rate is calculated from the input change rate data, and is input into the modulating section 36. As a result, the change rate data after being subjected to smoothing ($L2_1, L2_2, \ldots, L2_n$), and the mean change rate (Lav) are input into the modulating section 36.

After that, the modulating section 36 conducts modulation for each of the plural change rate data ($L2_1, L2_2, \ldots, L2_n$) by use of the mean change rate (Lav). The results of the modulation are input into the correction value calculating section 40. The correction value calculating section 40 adds the outputs ($L_1, L_2, \ldots, L_n$) from the modulating section 36 and the output (H) from the spike component removing section 39 with each other to calculate new correction values (1) to (n). All the correction values calculated in the correction value calculating section 40 are input into the correction value selecting section 41. The correction value selecting section 41 selects the correction value to be used for correcting the light quantity of the LED array 28, in response to the state of the operation of the copying machine.

As described above, in the copying machine according to this embodiment, the correction value selecting section 41 selects the correction value adequate for the state of the copying machine among the plurality of correction values calculated by the correction value calculating section 40. The light quantity of the LED array 28 is corrected by use of the correction value selected by the correction value selecting section 41. As a result, the light quantity of the LED array 28 can be corrected accurately in response to the change in the state of the copying machine. In this manner, unevenness of light quantity is prevented from occurring in the LED array 28, and an image of excellent quality without unevenness of density can be obtained from the copying machine.

As described above in detail, according to the fourth embodiment, in order to correct the light quantity of the LED array 28, the copying machine includes: the light quantity measuring section 31a for measuring the light quantity for each light emitting element as to the plurality of patterns where only one of the light emitting elements of the LED array 28 is turned on, and as to the pattern where all the light emitting elements thereof are turned on; the change rate calculating section 34b for calculating the plurality of rates of change in the light quantity distribution of the LED array 28, based on the data about the light quantity measured in the light quantity measuring section 31a; the correction value calculating section 40 for calculating a plurality of correction values for each of the light emitting elements of the LED array 28, based on the data about the light quantity measured in the light quantity measuring section 31a, and the plurality of rates of change in the light quantity distribution calculated in the change rate calculating section 34b; and a correction value selecting section 41 for selecting the correction value to be used for correcting the light quantity from the plurality of correction values calculated in the correction value calculating section 40, and the like.

Therefore, the correction value calculating section 40 calculates a plurality of the correction values, taking into consideration the rates of change in the light quantity distribution calculated in the change rate calculating section 34b, as well as the data about the light quantity measured in the light quantity measuring section 31a. The correction value selecting section 41 selects the correction value among the plurality of correction values calculated in the correction value calculating section 40, in response to the change in the state of the copying machine. In this manner, the LED controlling section can correct the light quantity of the LED array 28 in response to the change in the state of the copying machine. Therefore, even if there is a change in the operation state of the copying machine, unevenness of the light quantity is prevented from occurring in the LED array 28, and as a result, an image of excellent quality without unevenness of density can be obtained from the copying machine.

(Fifth Embodiment)

Finally, a fifth embodiment of the present invention will be described. A copying machine according to the fifth embodiment basically has the same structure as the copying machines of the first to fourth embodiments, except that a different method is employed for calculating the correction value for correcting the light quantity of the LED array 28. Therefore, the differences from the first to fourth embodiments will be mainly described in the fifth embodiment. The structures and operations same as those of the first to fourth embodiments will be properly omitted, and the constituent elements same as those of the first to fourth embodiments will be denoted by the same reference numerals.

Hereinafter, a method for measuring and correcting the light quantity for each light emitting element of the LED array 28 will be described. In the copying machine according to this embodiment, in order to measure the light quantity for each light emitting element of the LED array 28, the light emitting elements are allowed to emit light to form a specific optical pattern (hereinafter, refereed to as "a test pattern for correction") shown in FIG. 12. The test pattern for correction is formed on printing paper by an image forming station 2 through on-off control for each light emitting element of the LED array 28 based on the light quantity correction value (a default value in the initial stage) corresponding to each light emitting element and specific light emitting data.

The pattern image formed on the printing paper is read by a scanner 21 in an image reading section IR. Based on the information read from the pattern image, the CPU 26 judges the light quantity for each light emitting element of the LED array 28. Based on the result of the judgement, the light quantity correction value for each light emitting element is calculated, and the data about the calculated light quantity correction value is stored in an internal memory. After that, the copying machine conducts image formation by use of the data.

Figure 12:
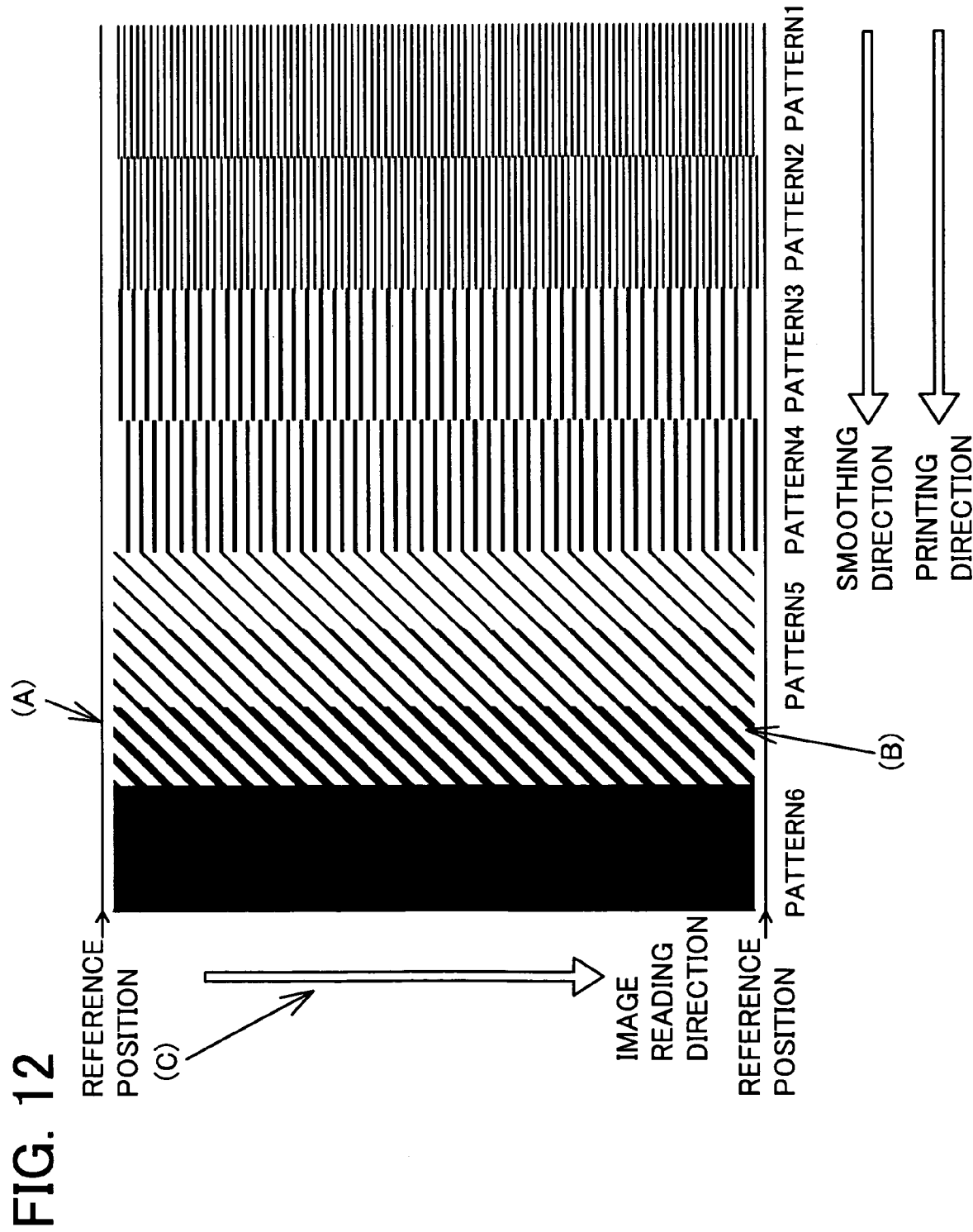
FIG. 12 shows optical patterns formed by image forming stations of a copying machine of the fifth embodiment.

Hereinafter, the test pattern for correction will be further described in detail. As shown in FIG. 12, the test pattern for correction is constituted by a plurality of patterns having different gradations and densities from each other (in this embodiment, six patterns) containing an actual pattern for image formation. The printing and smoothing directions (i.e. an image forming direction) are perpendicular to the image reading direction.

In addition, the test pattern for correction is provided with the following characteristics: (A) Two marks indicating information about reference positions are recorded along the printing direction perpendicular to the image reading direction, in order to specify the element address for each light emitting element of the LED array 28. By reading the marks, the magnification in the main scanning direction is corrected; (B) Smoothing is conducted in the printing direction (i.e. paper feeding direction) to reduce a noise generated in the process of image formation, and to produce image data for correction for use in producing correction data independent of the printing pattern; and (C) Specific lines of the image data after being subjected to smoothing are read, and the read information is obtained as read image data.

Figure 13:
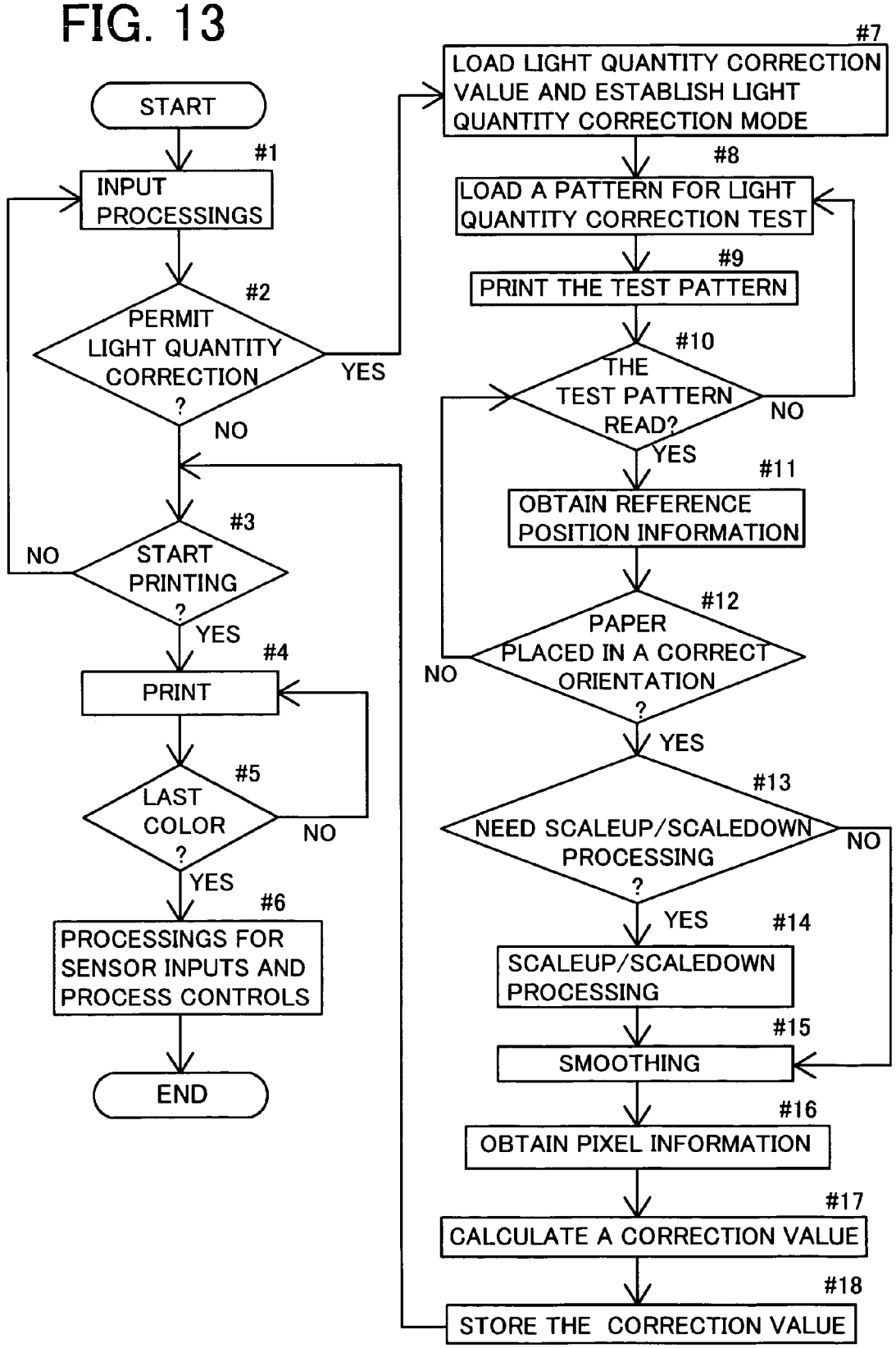
FIG. 13 is a flowchart showing process of correcting light quantity for each light emitting element of an LED array in the copying machine of the fifth embodiment.

Next, the process for reading the test pattern for correction described above by the scanner 21 so as to correct the light quantity for each light emitting element of the LED array 28 will be described with reference to FIG. 13. First, the CPU 26 accepts input processings for conducting various determinations through the control panel 27 (Step 1). Then, the CPU 26 determines whether or not to permit the light quantity correction (Step 2). As a result of the determination, if the CPU 26 determines not to permit the light quantity correction (No: Step 2), it determines whether or not to start the printing (Step 3). When the CUP 26 determines to start the printing (Yes: Step 3), the image forming stations 2C, 2M, 2Y, and 2K perform printing operations for their respective colors (Step 4). In the step of printing the last color (Yes: Step 5), various processings for sensor inputs and process controls are conducted (Step 6), and the printing operation is finished.

On the other hand, if the CPU 26 determines to permit the light quantity correction in the processing of Step 2 (Yes: Step 2), it loads a default light quantity correction value from the memory, and establishes a light quantity correction mode (Step 7). Then, the CPU 26 causes the scanner 21 to read the image of the test pattern printed on the printing paper (Step 10). As a result, the CPU 26 obtains information about the reference positions from the information read from the image of the test pattern (Step 11). Based on the information about the reference positions, the CPU 26 determines whether or not the paper is placed in a correct orientation (Step 12). If the paper is placed in a correct orientation (Yes: Step 12), the CPU 26 conducts scaling for enlarging or reducing the image of the test pattern, if necessary (Steps 13 and 14), and then, conducts smoothing (Step 15). By conducting the scaling for enlarging or reducing the image of the test pattern by use of the information about the reference positions, data with high accuracy can be obtained. After that, the CPU 26 obtains image information from the output after the smoothing (Step 16). From the image information, the CPU 26 calculates a correction value for each light emitting element (Step 17), and stores the correction value in the memory (Step 18). Then, the processing is proceeded to Step 3.

Figure 14:
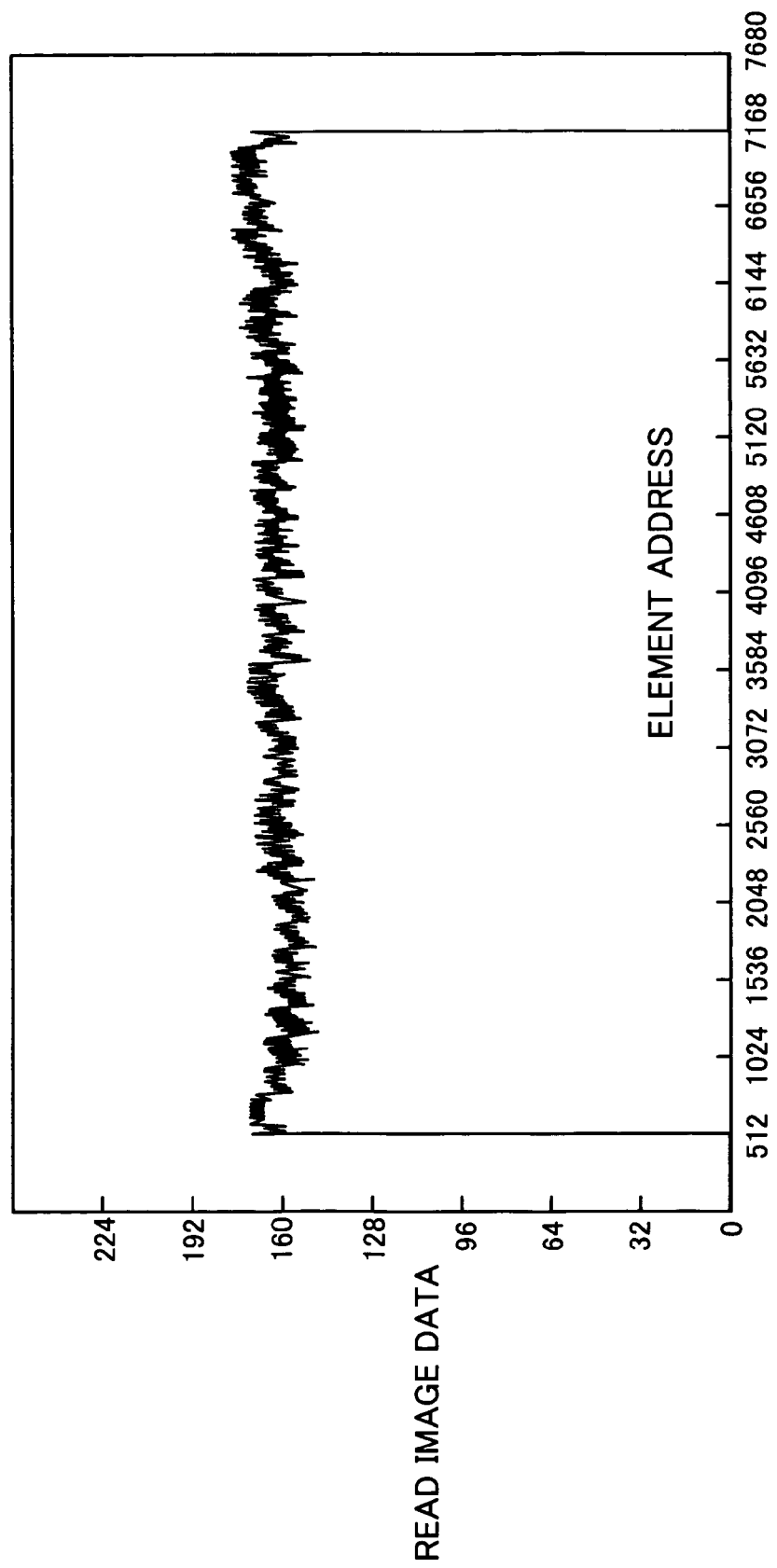
FIG. 14 shows an example of read image data obtained with the process shown in FIG. 13.

FIG. 14 is a diagram showing an example of the read image data obtained in the case of performing the processings described above. In FIG. 14, the horizontal axis is an element address (the total number of the pixels in one line is 7680, and the element address at a reference position is 512, 7168), and the vertical axis is a density. The read image data is data obtained by correcting the light quantity for each light emitting element by use of a certain value (in this embodiment, "32") among correction data (in this embodiment, 64 kinds from 0 to 63), and then by reading the pattern image formed by the light emitted from each light emitting element.

Figure 15:
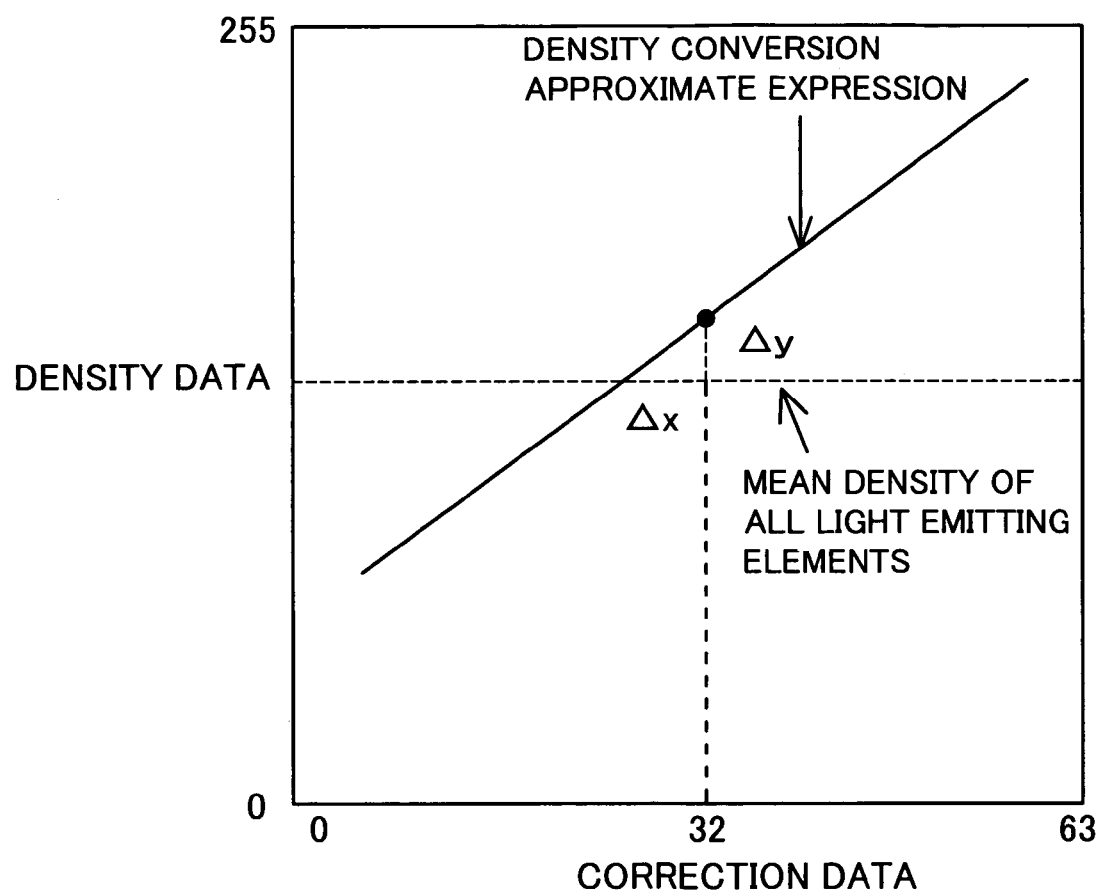
FIG. 15 shows a diagram accounting for a method of calculating correction data from density data obtained with the process shown in FIG. 13.

Hereinafter, a method for calculating correction data from the obtained data about the density will be described with reference to FIG. 15. In FIG. 15, the horizontal axis is correction data, and the vertical axis is density data. The density conversion approximate expression is calculated from the read image data for each light emitting element (the tilt in this case is at an eigen value). The value for modifying the correction data (in this case, corresponding to the value $\Delta x$ required for decreasing the density by $\Delta y$ when the correction data is 32) is calculated for each light emitting element in such a manner that the density in each light emitting element is identical to the mean density of all the light emitting elements. The sum of the correction data modifying value (for each light emitting element) and the original correction data (for each light emitting element) is new correction data.

Figure 16:
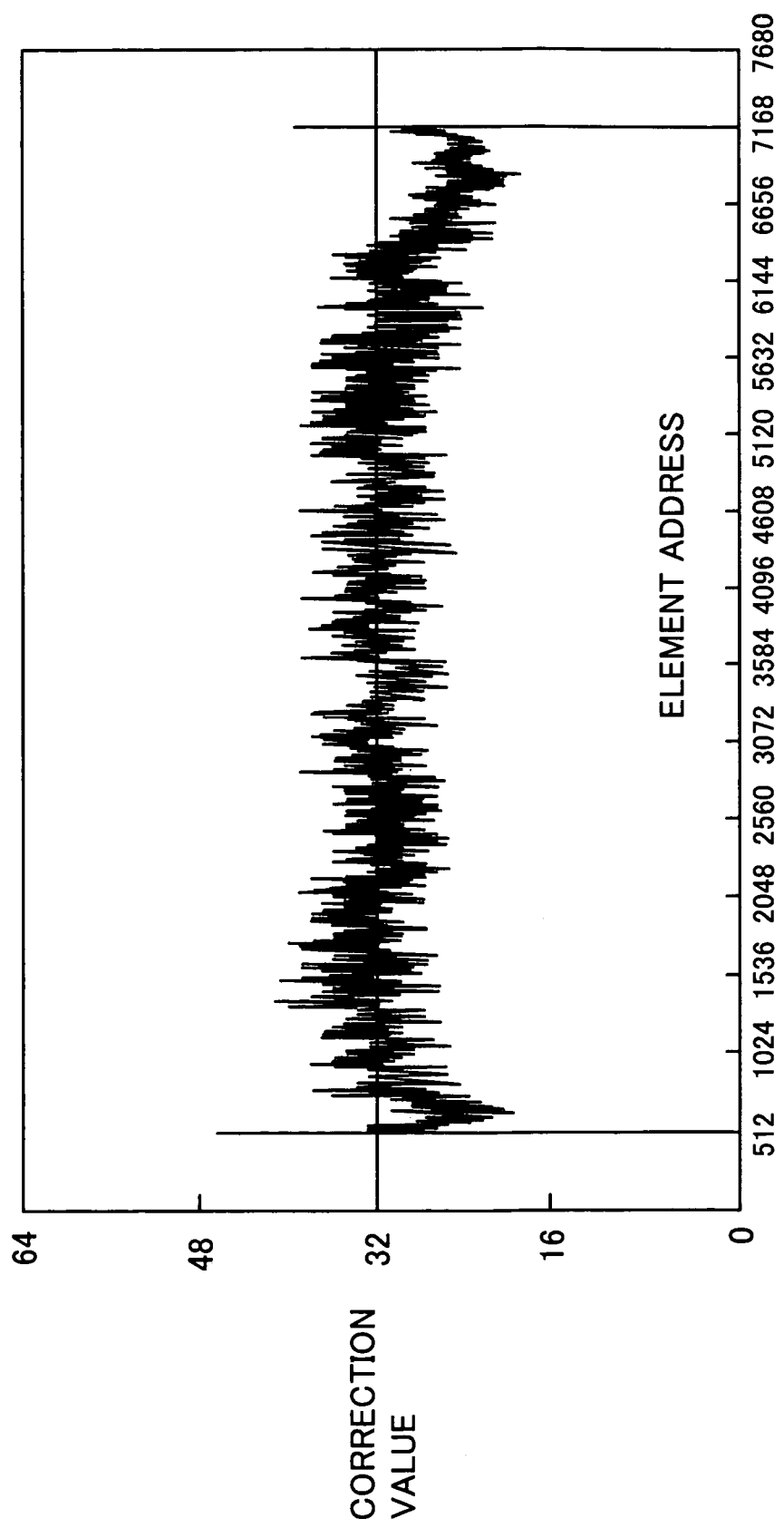
FIG. 16 shows an example of correction data finally calculated.

FIG. 16 shows the finally calculated correction data. In FIG. 16, the horizontal axis is an element address, and the vertical axis is a correction value. As shown in FIG. 16, the correction data is produced for each light emitting element. In this case, the data before correction is at a correction value of 32. In the copying machine in a tandem system such as shown in FIG. 1, the light quantity correction can be conducted for four colors simultaneously.

Figure 17:
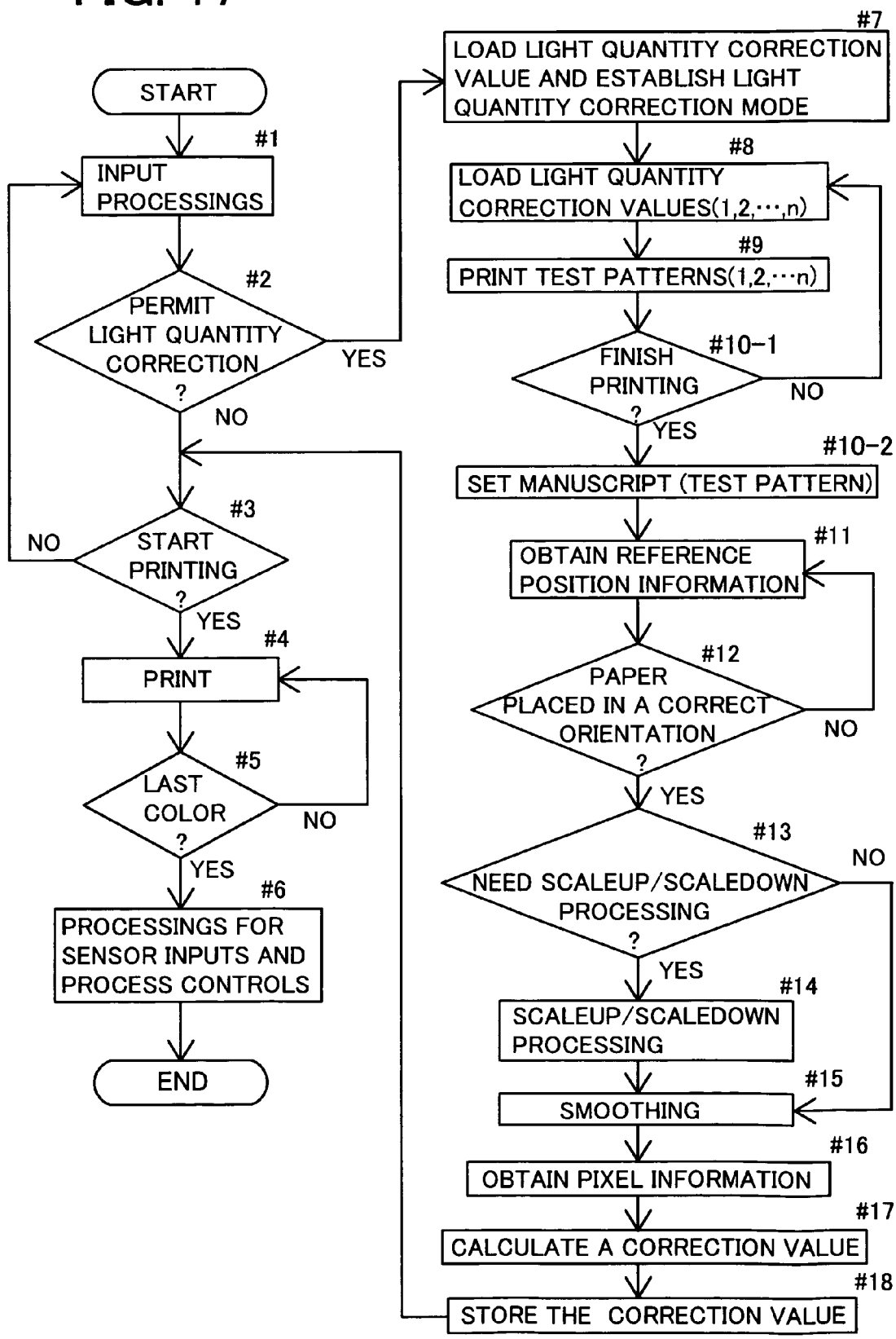
FIG. 17 is a flow chart showing another process of correcting light quantity for each light emitting element of an LED array.

FIG. 17 shows another procedure for correcting the light quantity of the light emitting elements. In this procedure, a plurality of test patterns for correction are read by the scanner 21. Based on the information read by the scanner 21, the light quantity is corrected. Therefore, the procedure shown in FIG. 17 is different from the procedure shown in FIG. 13 in Steps 7 to 10. That is, whereas the procedure shown in FIG. 13 uses a plurality of test patterns contained in one piece of printing paper, the procedure shown in FIG. 17 uses a plurality of test patterns each of which is contained in each of plural pieces of printing paper (1, 2, . . . , n).

Figure 18:
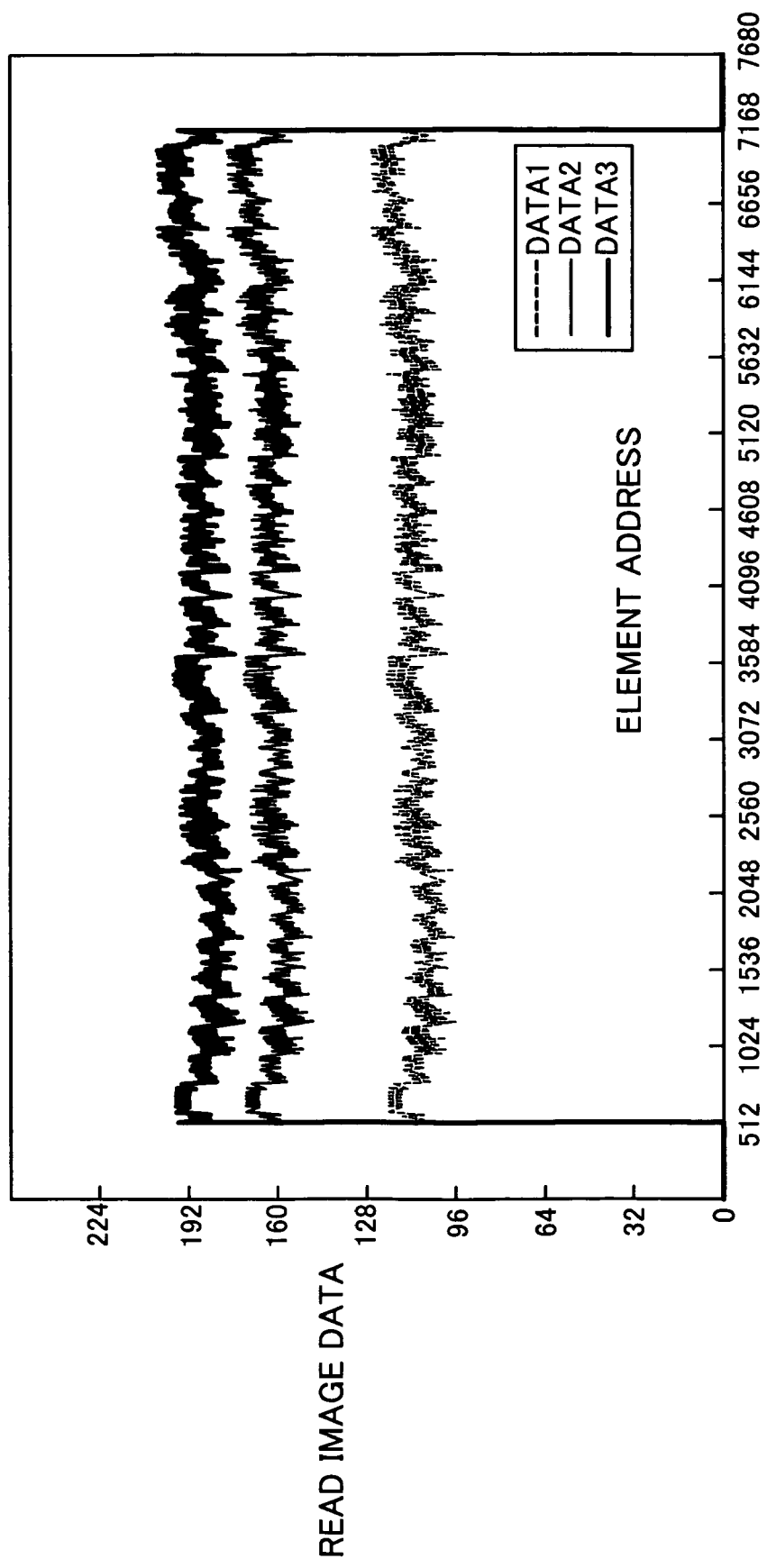
FIG. 18 shows an example of read image data obtained with the process shown in FIG. 17.

FIG. 18 is a graph showing an example of the read image data obtained in the case where the procedure shown in FIG. 17 is performed. The read image data shown in FIG. 18 is different from the read image data shown in FIG. 14 in that the read image data of FIG. 18 is obtained by reading a pattern image formed based on plural pieces of original correction data (in this case, 16, 32, and 48 in this order from below in the graph). In this embodiment, three kinds of correction data at the level of 16, 32, and 48 are used as original correction data; however, the correction data are not limited to these values, but another values may be properly employed.

Figure 19:
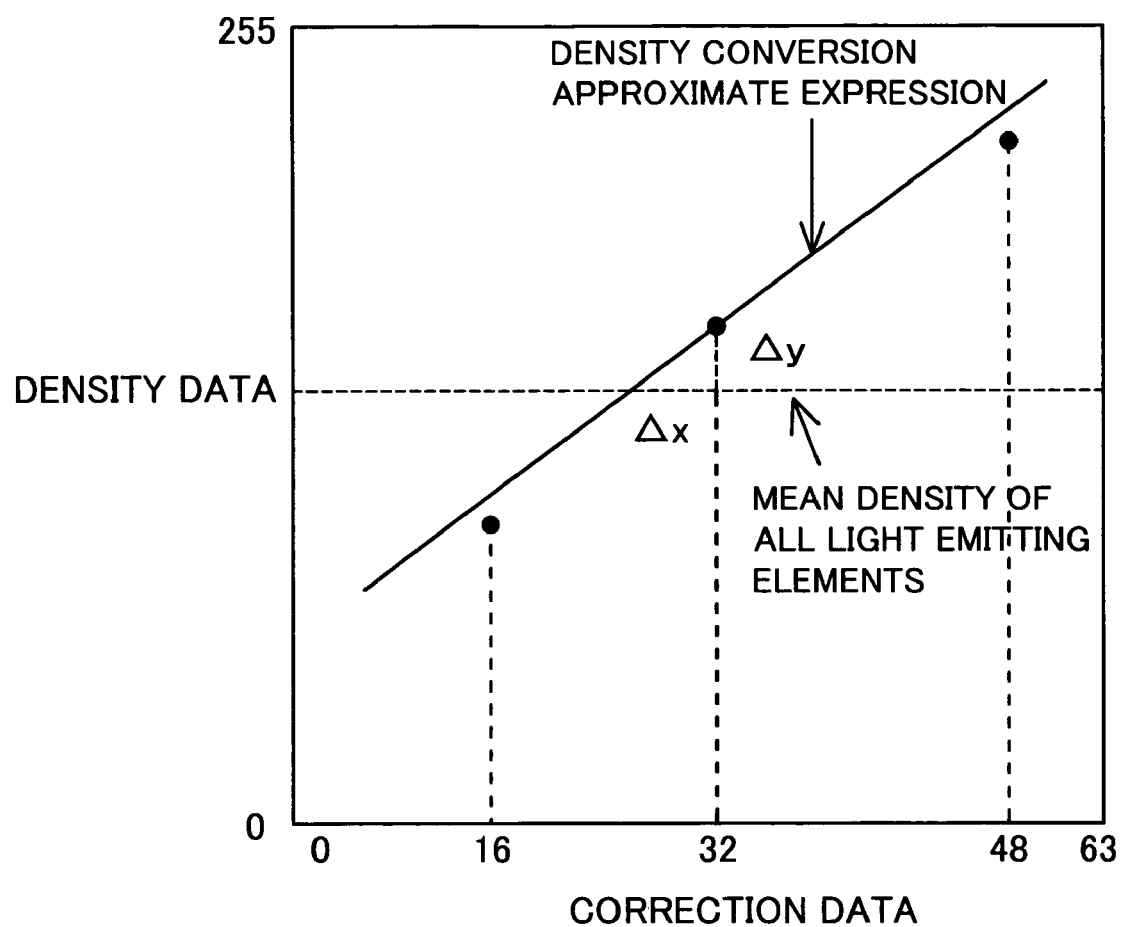
FIG. 19 shows a diagram accounting for a method of calculating correction data from density data obtained with the process shown in FIG. 17.

FIG. 19 is a graph showing a method for calculating correction data from the obtained density data. The method shown in FIG. 19 is different from the method shown in FIG. 15 in that the density change approximate expression is obtained from three values of the read image data (i.e. the correction data at 16, 32, and 48) for each light emitting element (the tilt in this case is at variable value for each light emitting element). Other points of the method shown in FIG. 19 is the same as the method shown in FIG. 15.

Figure 20:
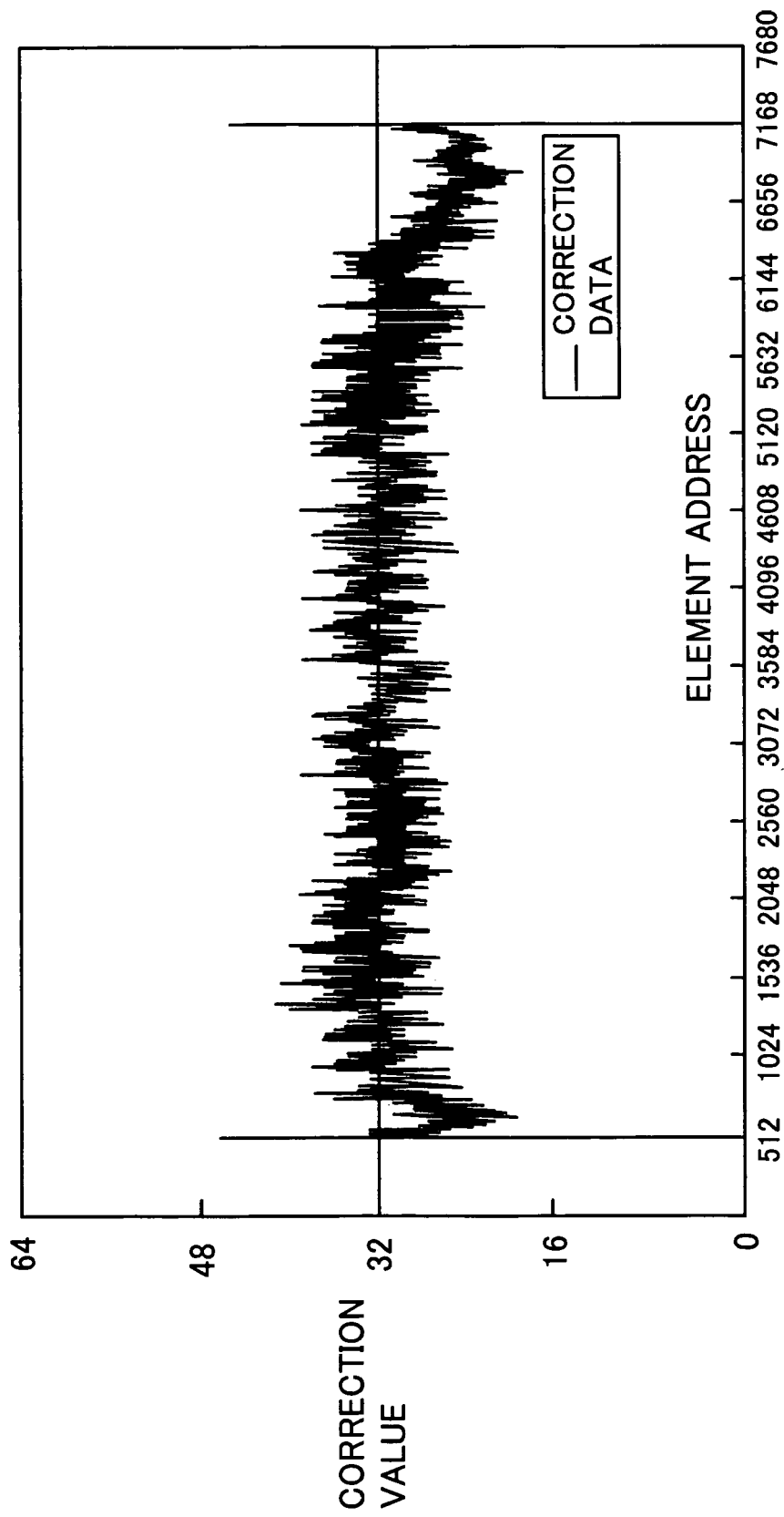
FIG. 20 shows an example of correction data finally calculated.

FIG. 20 shows the correction data which is finally calculated. FIG. 20 shows only the case where the data before correction is at a correction value of 32, which is the same as is the case shown in FIG. 16.

Figure 21:
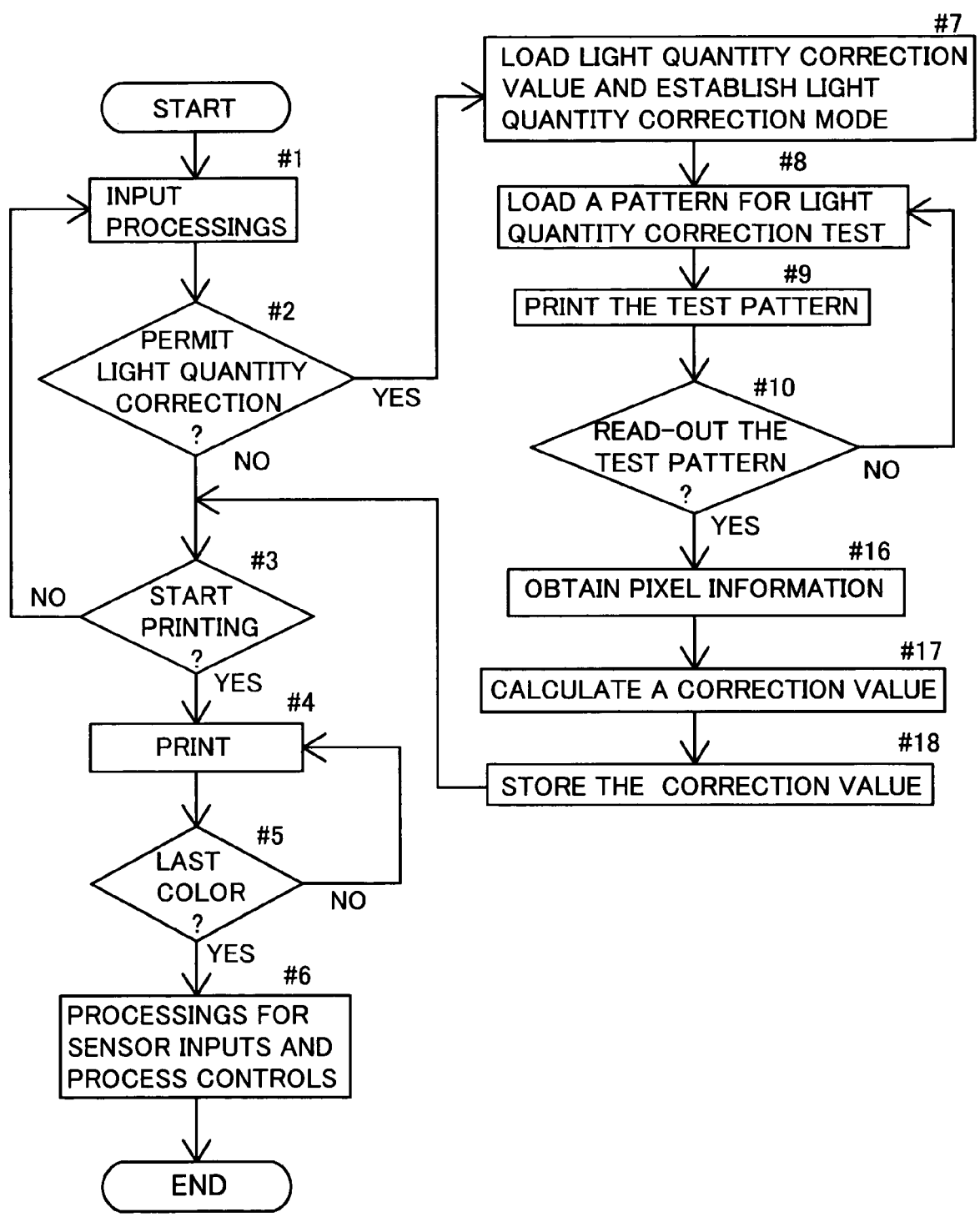
FIG. 21 is a flow chart showing another process of correcting light quantity for each light emitting element of an LED array.
Figure 22:
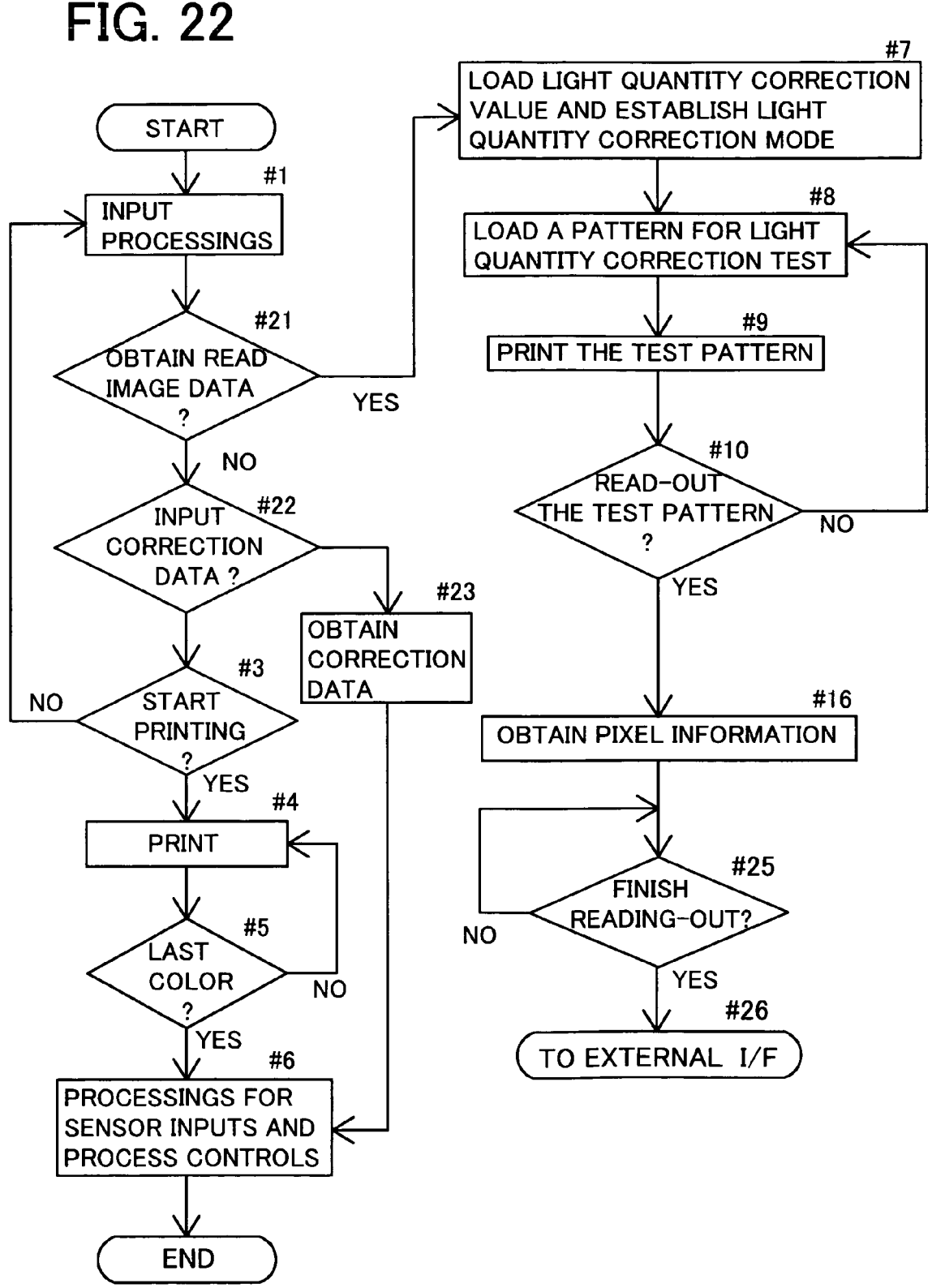
FIG. 22 is a flow chart showing another process of correcting light quantity for each light emitting element of an LED array.
Figure 23:
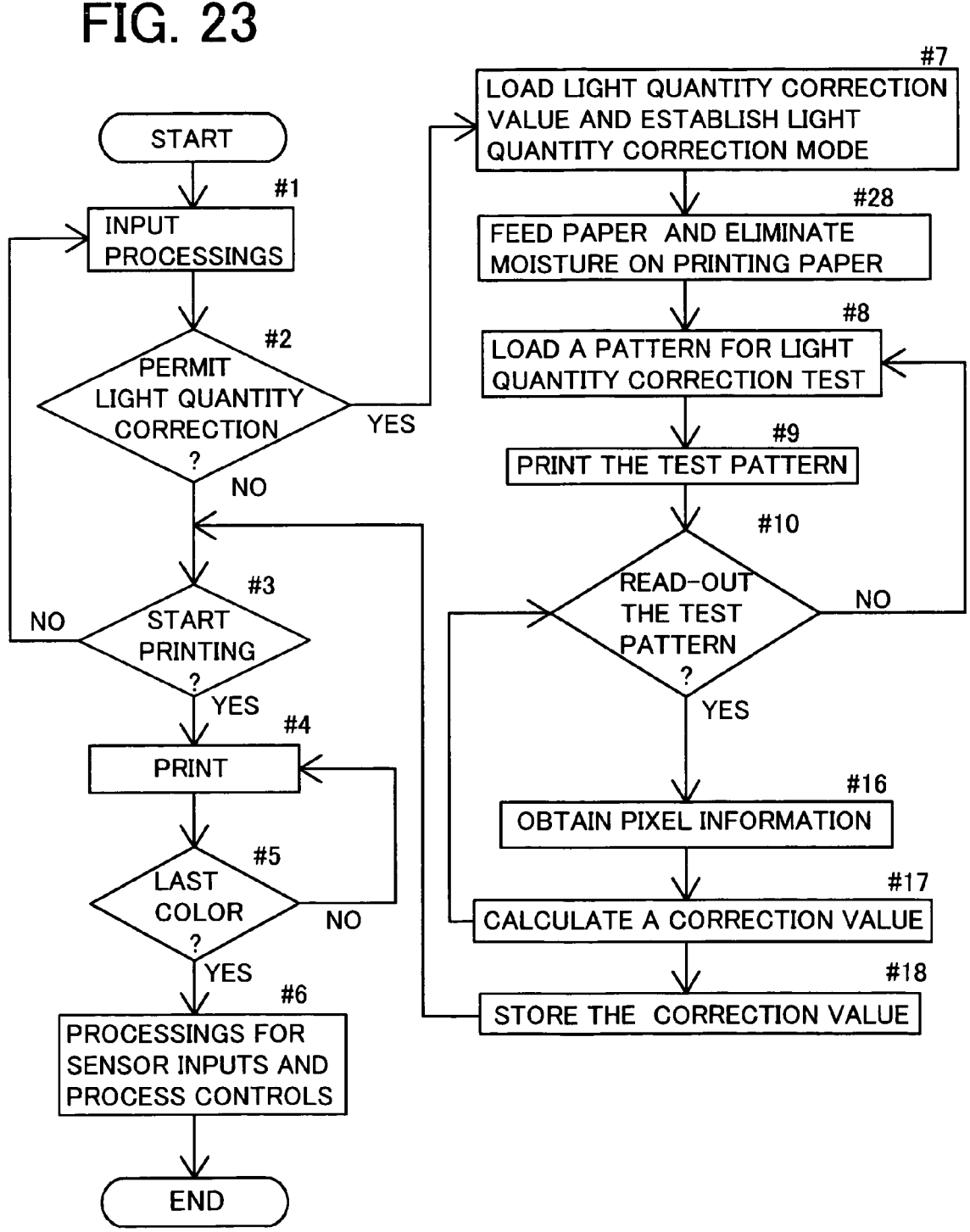
FIG. 23 is a flow chart showing another process of correcting light quantity for each light emitting element of an LED array.

Furthermore, FIGS. 21, 22, and 23 respectively show another processings for correcting the light quantity emitted from each light emitting element. The processings shown in FIG. 21 are basically the same as those shown in FIG. 13, except that Steps 11 to 15 of the processings shown in FIG. 13 are omitted.

FIG. 22 shows a procedure in which the processings in Steps 21 to 23 are conducted instead of the processing in Step 2 in FIG. 21, and the processings in Steps 25 and 26 are conducted instead of the processings in Steps 17 and 18 in FIG. 21. In the procedure shown in FIG. 22, after the processing in Step 1, the CPU 26 determines whether or not to obtain the read image data (Step 21). If the CPU 26 determines to obtain the read image data (Yes: Step 21), it conducts the processing in Step 7. On the other hand, if the CPU 26 determines not to obtain the read image data (No: Step 21), it confirms whether or not the correction data has been input therein (Step 22). If it is confirmed that the correction data has been input (Yes: Step 22), the correction data has been input into the CPU 26 from the outside of the copying machine via the external I/F 13, and therefore the CPU 26 accepts the correction data (Step 23). Contrary to this, if it is confirmed that no correction data has been input (No: Step 22), the CPU 26 conducts the processing in Step 3. After the processing in Step 16, the CPU 26 checks whether or not the reading by the scanner 21 has been finished (Step 25). If the reading has been finished (Yes: Step 25), the CPU 26 outputs the read image data to the outside of the copying machine via the external I/F 13 (Step 26). In this manner, the read image data can be output into the external device, instead of the copying machine, as the C, M, Y, and K signals or R, G, and B signals.

The procedure shown in FIG. 23 is different from the procedure shown in FIG. 21 in that Step 28 for feeding the paper and eliminating moisture thereon is conducted between Steps 7 and 8 of FIG. 21. By conducting the procedure of Step 28, moisture on the printing paper can be eliminated (i.e. a recording medium) before an image is formed thereon. In an exemplary moisture eliminating processing, the printing paper is passed through the fixing device 9 before printing is conducted thereon. The printing paper may more or less expand or contract to change its size before and after the printing is conducted thereon, depending on its degree of moisture. The moisture eliminating processing eliminates the influence of the moisture content to the printing paper.

As described above in detail, in the copying machine according to the fifth embodiment, an optical pattern formed by the light emitted from the LED array 28 is in a plurality of gradations and densities containing the pattern of the image to be actually formed. By reading the optical pattern, the light quantity correction value corresponding to each light emitting element of the LED array 28 is produced. This structure is simple, but an adequate light quantity correction value can be obtained in the copying machine. As a result, the light quantity can be corrected with high accuracy, and an image of excellent quality without unevenness of density can be formed. In addition, the optical pattern is formed in a direction perpendicular to the direction along which the optical pattern is read. With this arrangement, it becomes possible to obtain an adequate light quantity correction value independent of the optical pattern.

In the fifth embodiment described above, the light quantity is corrected by reading the output image by the scanner; however, the reading system is not limited to the scanner. Alternatively, an image developed on a photosensitive drum or transfer belt may be directly read by use of a measuring device such as an auto image density sensor (AIDC) and the like for each light emitting element or in each specific cycle thereof. In this case, the light quantity may be corrected in the same manner as that described above by use of the mean value of the light quantities integrated in the sensor as the measured data about the light quantity for each light emitting element. It is also possible that the light emission pattern itself which exposes the photosensitive drum is directly read by a measuring device.

The first to fifth embodiments are described only for the explanatory purpose, and do not limit the present invention thereto. Therefore, various improvements and modification may be possible as far as they do not depart from the scope of the present invention. In addition, whereas the above description in the first to fifth embodiments exemplifies the case where the present invention has been applied to the copying machine, the present invention may be used in other applications such as facsimile and printer, instead of the copying machine.

What is claimed is:

1. A light quantity correction method for an exposing device provided with a plurality of light emitting elements comprising steps of:

Step 1 where the exposing device is allowed to emit light in a plurality of light emission patterns, and quantity of light emitted from each light emitting element is measured for each light emission pattern;

Step 2 where a change rate of a light quantity distribution of the exposing device is calculated based on the light quantity measured for each light emission pattern; and Step 3 where a correction value for the light quantity emitted from each light emitting element is calculated based on the light quantity measured in the Step 1 and the change rate of the light quantity distribution calculated in the Step 2.

2. A light quantity correction method for the exposing device according to claim 1, wherein the plurality of light emission patterns include:

a first pattern where only one of all the light emitting elements of the exposing device is turned on; and a second pattern where all the light emitting elements of the exposing device are turned on.

3. A light quantity correction method for the exposing device according to claim 2, wherein plural times of light quantity measurement are conducted for the second pattern in the Step 1.

4. A light quantity correction method for the exposing device according to claim 3, wherein focus position of the light emitting elements is shifted every time for the plural times of light quantity measurements for the second pattern.

5. A light quantity correction method for the exposing device according to claim 1, wherein
a plurality of correction values of the light quantity for each of the light emitting elements are calculated in the Step 3, and the method includes a further step of selecting a correction value to be used for light quantity correction of the exposing device among the plurality of correction values.

6. A light quantity correction method for the exposing device according to claim 5, wherein the plurality of light emission patterns include:
   a first pattern where only one of all the light emitting elements of the exposing device is turned on; and
   a second pattern where all the light emitting elements of the exposing device are turned on.

7. A light quantity correction method for the exposing device according to claim 6, wherein plural times of light quantity measurement are conducted for the second pattern in the Step 1.

8. A light quantity correction method for the exposing device according to claim 7, wherein
   a plurality of change rates relating to light quantity distribution of the exposing device are calculated in the Step 2, and
   a plurality of correction values of the light quantity for each of the light emitting elements are calculated in the Step 3 based on the plurality of change rates obtained in the Step 2.

9. A light quantity correction method for the exposing device according to claim 7, wherein focus position of the light emitting elements is shifted every time for the plural times of light quantity measurements for the second pattern.

10. An image forming device comprising:
    an exposing device provided with a plurality of light emitting elements; and
    a controller for conducting process including the following steps:
    Step 1 where the exposing device is allowed to emit light in a plurality of light emission patterns, and quantity of light emitted from each light emitting element is measured for each light emission pattern;
    Step 2 where a change rate of a light quantity distribution of the exposing device is calculated based on the light quantity measured for each light emission pattern; and
    Step 3 where a correction value of the light quantity emitted from each light emitting element is calculated based on the light quantity measured in the Step 1 and the change rate of the light quantity distribution calculated in the Step 2.

11. An image forming device according to claim 10 wherein the plurality of light emission patterns include:
    a first pattern where only one of all the light emitting elements of the exposing device is turned on; and
    a second pattern where all the light emitting elements of the exposing device are turned on.

12. An image forming device according to claim 11, wherein the controller conducts plural times of light quantity measurements for the second pattern.

13. An image forming device according to claim 12, wherein the controller shifts focus positions of the light emitting elements every time to conduct the plural times of light quantity measurements for the second pattern.

14. An image forming device according to claim 10, wherein the controller calculates a plurality of correction values of the light quantity for each of the light emitting elements and selects a correction value to be used for light quantity correction among the plurality of correction values.

15. An image forming device according to claim 14, wherein the plurality of light emission patterns include:
    a first pattern where only one of all the light emitting elements of the exposing device is turned on; and
    a second pattern where all the light emitting elements of the exposing device are turned on.

16. An image forming device according to claim 15, wherein the controller conducts light quantity measurement for the second pattern plural times.

17. An image forming device according to claim 16, wherein the controller calculates a plurality of change rates relating to light quantity distribution of the exposing device and further calculates a plurality of correction values of the light quantity for each of the light emitting elements based on the plurality of change rates.

18. An image forming device according to claim 16, wherein the controller shifts focus positions of the light emitting elements every time to conduct the plural times of light quantity measurements for the second pattern.

19. A light quantity correction method for an exposing device provided with a plurality of light emitting elements comprising steps of:
    Step 1 where an exposing device is allowed to emit light to form an optical pattern;
    Step 2 where the optical pattern formed in the Step 1 is read; and
    Step 3 where a correction value of light quantity for each light emitting element is calculated based on data read in the Step 2,
    wherein the optical pattern is constituted by a plurality of patterns having gradations different from each other.

20. A light quantity correction method for the exposing device according to claim 19, wherein the optical pattern is formed on a recording medium.

21. A light quantity correction method for the exposing device according to claim 19, wherein the optical pattern includes a mark to indicate positional information.

22. A light quantity correction method for the exposing device according to claim 19 including a further step where data read in the Step 2 is subjected to smoothing.

23. An image forming device comprising:
    an exposing device provided with a plurality of light emitting elements;
    an image forming station for allowing the exposing device to emit light to form an optical pattern;
    a reader for reading the optical pattern formed by the image forming station; and
    a controller for conducting process of calculating a correction value of light quantity for each light emitting element based on data read by the reader,
    wherein the optical pattern is constituted by a plurality of patterns having gradations different from each other.

24. An image forming device according to claim 23, wherein the image forming station forms the optical pattern on a recording medium.

25. An image forming device according to claim 24, wherein the controller conducts process of eliminating moisture on the recording medium before forming the optical pattern.

26. An image forming device according to claim 23, wherein the optical pattern includes a mark to indicate positional information, and the controller obtains positional information based on the mark read by the reader and corrects reading magnification of the reader based on the thus obtained positional information.

27. An image forming device according to claim 23, wherein the controller conducts smoothing for data read by the reader and calculates the correction value of the light quantity for each light emitting element based on data obtained after smoothing.

28. An image forming device according to claim 27, wherein the controller conducts smoothing in a direction the same as an optical pattern forming direction of the image forming station.

29. An image forming device according to claim 23, wherein the controller outputs the data read by the reader to the outside of the image forming device and obtains correction value of light quantity for each light emitting element from the outside of the image forming device, instead of calculating the correction value based on the data read by the reader.

30. An image forming device according to claim 23, wherein the reader reads the optical pattern in a direction perpendicular to a direction in which the image forming station forms the optical pattern.

* * * * *

UNITED STATES PATENT AND TRADEMARK OFFICE
CERTIFICATE OF CORRECTION

| | |
|---|---|
| PATENT NO. | : 6,982,813 B2 |
| APPLICATION NO. | : 09/776883 |
| DATED | : January 3, 2005 |
| INVENTOR(S) | : Katsuyuki Hirata |

It is certified that error appears in the above-identified patent and that said Letters Patent is hereby corrected as shown below:

On the Title Page #56, under REFERENCES CITED, FOREIGN PATENT DOCUMENTS, please add the following reference:

EP 0850769    7/1/1998

Signed and Sealed this

Twelfth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,982,813 B2 | Page 1 of 1 |
| APPLICATION NO. | : 09/776883 | |
| DATED | : January 3, 2006 | |
| INVENTOR(S) | : Katsuyuki Hirata | |

It is certified that error appears in the above-identified patent and that said Letters Patent is hereby corrected as shown below:

On the Title Page #56, under REFERENCES CITED, FOREIGN PATENT DOCUMENTS, please add the following reference:

EP 0850769    7/1/1998

This certificate supersedes Certificate of Correction issued September 12, 2006.

Signed and Sealed this

Seventh Day of November, 2006

JON W. DUDAS
*Director of the United States Patent and Trademark Office*